US012664383B2

(12) United States Patent
Kim et al.

(10) Patent No.: US 12,664,383 B2
(45) Date of Patent: Jun. 23, 2026

(54) METHOD AND DEVICE FOR PERFORMING COMMUNICATION BASED ON BACKSCATTER IN WIRELESS COMMUNICATION SYSTEM

(71) Applicant: KOREA ADVANCED INSTITUTE OF SCIENCE AND TECHNOLOGY, Yuseong-gu (KR)

(72) Inventors: Song Min Kim, Daejeon (KR); Kangmin Bae, Daejeon (KR); Namjo Ahn, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 267 days.

(21) Appl. No.: 18/073,149

(22) Filed: Dec. 1, 2022

(65) Prior Publication Data

US 2023/0177291 A1      Jun. 8, 2023

(30) Foreign Application Priority Data

| Dec. 2, 2021 | (KR) | ......................... | 10-2021-0171342 |
| May 31, 2022 | (KR) | ......................... | 10-2022-0066606 |
| Nov. 28, 2022 | (KR) | ......................... | 10-2022-0162049 |

(51) Int. Cl.
| G06K 7/10 | (2006.01) |
| H04B 1/69 | (2011.01) |
| H04L 27/10 | (2006.01) |

(52) U.S. Cl.
CPC ..... *G06K 7/10366* (2013.01); *G06K 7/10009* (2013.01); *H04L 27/103* (2013.01); *H04B 2001/6912* (2013.01)

(58) Field of Classification Search
CPC ........... G06K 7/10366; G06K 7/10009; G01S 7/356; G01S 13/32; H04L 27/103; H04B 2001/6912; H04B 1/69
See application file for complete search history.

(56) References Cited

U.S. PATENT DOCUMENTS

| 6,046,683 A | 4/2000 | Pidwerbetsky et al. |
| 6,084,530 A | 7/2000 | Pidwerbetsky et al. |
| | (Continued) | |

FOREIGN PATENT DOCUMENTS

| CN | 1741514 A | 3/2006 |
| CN | 102741863 A | 10/2012 |
| | (Continued) | |

OTHER PUBLICATIONS

Communication dated Feb. 23, 2025 issued by the State Intellectual Property Office of the P.R.China in application No. 202211539902.3.

(Continued)

*Primary Examiner* — Yong Hang Jiang
(74) *Attorney, Agent, or Firm* — Sughrue Mion, PLLC

(57) ABSTRACT

A communication device includes an interrogator configured to output interrogation signals including consecutive unit chirp signals that change from a first frequency to a second frequency, and a backscatter tag configured to receive the interrogation signals and frequency-modulate the interrogation signals to generate and provide tag signals, wherein the interrogator is further configured to receive the tag signals and demodulate the tag signals.

9 Claims, 32 Drawing Sheets

Inter-chip phase continuity

(56) References Cited

U.S. PATENT DOCUMENTS

| | | | | |
|---|---|---|---|---|
| 6,107,910 | A * | 8/2000 | Nysen | G01S 13/755 |
| | | | | 340/10.3 |
| 7,978,636 | B2 | 7/2011 | Gaur | |
| 9,504,032 | B2 | 11/2016 | Wang et al. | |
| 10,070,386 | B2 | 9/2018 | Dinh et al. | |
| 10,812,130 | B2 | 10/2020 | Talla et al. | |
| 11,688,929 | B2 | 6/2023 | Charvat et al. | |
| 2004/0130442 | A1 | 7/2004 | Breed et al. | |
| 2006/0045219 | A1 | 3/2006 | Wang et al. | |
| 2007/0109099 | A1 * | 5/2007 | Raphaeli | G06K 7/10306 |
| | | | | 340/10.2 |
| 2007/0296305 | A1 * | 12/2007 | Hines | H03H 9/14547 |
| | | | | 310/313 B |
| 2011/0187509 | A1 | 8/2011 | Raptis et al. | |
| 2014/0229387 | A1 | 8/2014 | Chow | |
| 2015/0318881 | A1 * | 11/2015 | Barott | H04B 1/10 |
| | | | | 375/285 |
| 2016/0187223 | A1 | 6/2016 | Preston et al. | |
| 2016/0191163 | A1 | 6/2016 | Preston et al. | |
| 2017/0181118 | A1 | 6/2017 | Charvat et al. | |
| 2020/0125810 | A1 * | 4/2020 | Pettus | G01S 13/9089 |
| 2020/0160133 | A1 | 5/2020 | Zajic et al. | |
| 2020/0267561 | A1 * | 8/2020 | Lakshminarayan | H04W 72/51 |
| 2021/0114205 | A1 | 4/2021 | Cristache | |
| 2021/0121967 | A1 * | 4/2021 | Vetter | B23B 45/003 |
| 2021/0373111 | A1 | 12/2021 | Hui et al. | |
| 2023/0179258 | A1 | 6/2023 | Kim et al. | |

FOREIGN PATENT DOCUMENTS

| | | | |
|---|---|---|---|
| CN | 1138556148 | A | 10/2021 |
| JP | 2004-153558 | A | 5/2004 |
| JP | 2008-245278 | A | 10/2008 |
| KR | 10-1709421 | B1 | 2/2017 |
| KR | 10-2017-0036455 | A | 4/2017 |

OTHER PUBLICATIONS

Communication dated Apr. 2, 2025 issued by the United States Patent and Trademark Office in U.S. Appl. No. 18/072,322.

"NSDI '22: 19th USENIX Symposium on Networked Systems Design and Implementation", USENIX: The Advanced Computing Systems Association, Apr. 4-6, 2022, Renton, WA, USA, 5 pages total.

Kang Min Bae et al., "OmniScatter: Extreme Sensitivity mmWave backscattering Using Commodity FMCW Radar," In Proceedings of the 20th Annual International Conference on Mobile Systems, Applications and Services (MobiSys '22), Jun. 25 to Jul. 1, 2022, pp. 316-329 URL:https://doi.org/10.1145/3498361.3538924.

Huang Zhuang et al., "Research on Backscatter Communication System of Automotive Radar Based on Spread Spectrum," Radar Science and Technology, Jun. 2020, vol. 18, No. 3, pp. 247-253, and p. 261, DOI:10.3969/j.issn.1672-2337.2020.03.003, URL:http://radarst.ijournal.cn/ldkxyjs/ch/reader/create_pdf.aspx?file_no=202003003&flag=1&journal_id=ldkxyjs&year_id=2020.

* cited by examiner

Inter-chip phase continuity

METHOD AND DEVICE FOR PERFORMING COMMUNICATION BASED ON BACKSCATTER IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2021-0171342, filed on Dec. 2, 2021, and 10-2022-0066606, filed on May 31, 2022 in the Korean Intellectual Property Office, and 10-2022-0162049, filed on Nov. 28, 2022 in the Korean Intellectual Property Office, the disclosures of which are incorporated by reference herein in their entireties.

BACKGROUND

1. Field

The disclosure relates to a method and device for performing communication based on backscatter in a wireless communication system, and more particularly, a method and device for performing communication by frequency-modulating, through backscatter, an interrogation signal in which a unit chirp signal is repeated.

2. Description of the Related Art

As the number of Internet-of-Things (IoT) devices deployed by 2035 with the goal of massive machine-type communications (mMTC) is expected to increase up to 1 trillion, massive connectivity has long been considered as a key to the success of IoT and various future services.

Backscatter is an attractive option for large-scale networking, and a low-power operation provides long-term sustainability. In addition, the abundant spectral resources of millimeter waves (mmWave) covering bandwidths of up to 14 GHz in the 60-GHz band of 6th Generation (6G) have great potential for large-scale networks.

SUMMARY

Backscatter networking using millimeter waves needs to overcome several difficulties. As one of the difficulties, a backscattered signal has lower power than to the power of clutter noise due to ambient reflection in a millimeter wave spectrum, and thus is vulnerable to errors. This, along with attenuation of the backscattered signal, has a greater effect in a room where a signal is frequently reflected.

Another difficulty is that, for low-cost circuits and an ultra-low-power operation, backscatter devices is unable to access a wide bandwidth of millimeter waves over the range of several GHz, is unable to share channels for simultaneous communication, and thus has limited scalability.

Embodiments are to solve such difficulties of the prior art. That is, one of the objects of the embodiments is to provide a communication method using backscatter.

The technical objects of the embodiments are not limited to those described above, and other technical objects may be inferred from the following embodiments.

Additional aspects will be set forth in part in the description which follows and, in part, will be apparent from the description, or may be learned by practice of the presented embodiments of the present disclosure.

According to an aspect of the disclosure, a communication device includes an interrogator configured to output interrogation signals including consecutive unit chirp signals that change from a first frequency to a second frequency, and a backscatter tag configured to receive the interrogation signals and frequency-modulate the interrogation signals to generate and provide tag signals, wherein the interrogator is further configured to receive the tag signals and demodulate the tag signals.

According to another aspect of the disclosure, an interrogator includes an interrogation signal providing unit configured to output interrogation signals including consecutive unit chirp signals that change from a first frequency to a second frequency, and a demodulation unit configured to receive and demodulate tag signals generated by frequency-modulating the interrogation signals, wherein the interrogation signals are periodic signals including the consecutive unit chirp signals with a continuous phase.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram for describing decoding characteristics of an interrogation signal composed of one unit chirp signal and an interrogation signal composed of a repetition of a chirp signal according to an embodiment;

DETAILED DESCRIPTION

Figure 1:
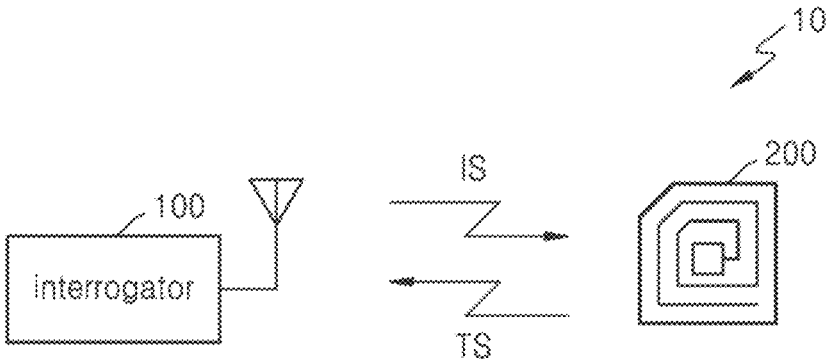
FIG. 1 is a conceptual diagram illustrating a wireless communication system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described in detail with reference to the accompanying drawings for those of skill in the art to be able to perform the disclosure without any difficulty. The disclosure may, however, be embodied in many different forms and should not be construed as being limited to the embodiments of the disclosure set forth herein. In addition, in order to clearly describe the disclosure, portions that are not relevant to the description of the disclosure are omitted, and similar reference numerals are assigned to similar elements throughout the present specification.

Although the terms used in the disclosure are selected from among common terms that are currently widely used in consideration of their function in the disclosure, the terms may be different according to an intention of those of ordinary skill in the art, a precedent, or the advent of new technology. Also, in particular cases, the terms are discretionally selected by the applicant of the disclosure, in which case, the meaning of those terms will be described in detail in the corresponding embodiment. Therefore, the terms used herein are not merely designations of the terms, but the terms are defined based on the meaning of the terms and content throughout the disclosure.

The singular expression may also include the plural meaning as long as it is not inconsistent with the context. Unless otherwise defined, all terms, including technical and scientific terms, used herein have the same meaning as commonly understood by those of skill in the art to which the disclosure pertains based on an understanding of the disclosure. Terms, such as those defined in commonly used dictionaries, are to be interpreted as having a meaning that is consistent with their meaning in the context of the relevant art and the disclosure, and are not to be interpreted in an idealized or overly formal sense unless expressly so defined herein.

Throughout the disclosure, when a part "includes" an element, it is to be understood that the part may additionally include other elements rather than excluding other elements as long as there is no particular opposing recitation. Also, as used herein, the terms such as " . . . er (or)", " . . . unit", " . . . module", etc., denote a unit that performs at least one function or operation, which may be implemented as hardware or software or a combination thereof.

Throughout the present specification, when a part is referred to as being "connected to" another part, it may be "directly connected to" the other part or be "electrically connected to" the other part through an intervening element.

As used herein, the expression "configured to" may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain circumstance, the expression "a system configured to" may indicate the system "capable of" together with another device or components. For example, "a processor configured (or set) to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory.

Here, it could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-usable or computer-readable memory capable of orienting a computer or other programmable data processing equipment to implement a function in a particular mode, and thus, the instructions stored in the computer-usable or computer-readable memory may also produce a production item involving an instruction means configured to perform a function described in flowchart block(s). The computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

Hereinafter, embodiments are described with reference to the accompanying drawings.

FIG. 1 is a conceptual diagram illustrating a wireless communication system 10 according to an embodiment.

Referring to FIG. 1, the wireless communication system 10 according to an embodiment may include an interrogator 100 and at least one backscatter tag (e.g., a backscatter tag 200).

The interrogator 100 may output an interrogation signal IS. The interrogator 100 may generate the interrogation signal IS by repeating a unit chirp signal that changes from a first frequency to a second frequency for a preset duration.

The backscatter tag 200 may receive the interrogation signal output from the interrogator 100. The backscatter tag 200 may generate a tag signal TS by performing frequency modulation on the received interrogation signal. For example, the backscatter tag 200 may provide the tag signal TS by modulating the frequency of the interrogation signal based on a frequency corresponding to provided data. The backscatter tag 200 may receive data provided from an electronic device including the backscatter tag 200 or from another electronic device connected to the backscatter tag 200.

The interrogator 100 may receive the tag signal TS from the backscatter tag 200. As the interrogation signal IS has a structure in which the unit chirp signal is repeated for the preset duration, the characteristics of the modulated frequency may be different from that of a signal composed of one unit chirp signal. In detail, a tag signal obtained by frequency-modulating from an interrogation signal composed of one unit chirp signal is added to a clutter noise signal, whereas the tag signal TS obtained by frequency-modulating the interrogation signal IS in which the unit chirp signal is repeated may be obtained at a frequency that is exclusive of clutter noise signals. As such, noise signals and data signal are separated from each other, and thus, the interrogator 100 may obtain a high signal-to-noise ratio (SNR).

Figure 2:
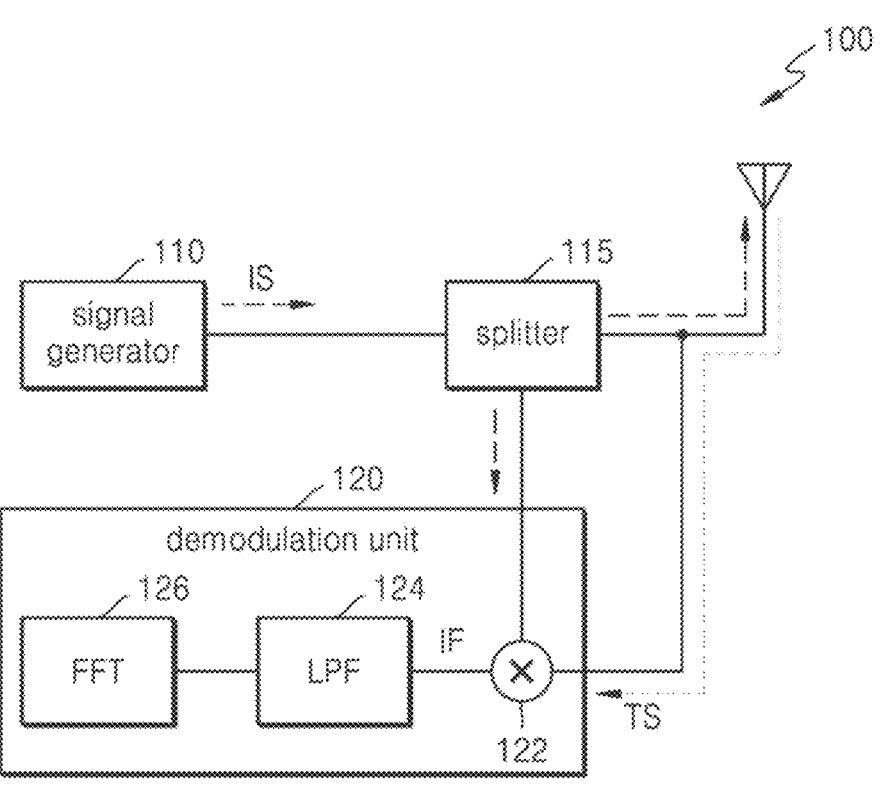
FIG. 2 is a block diagram of an interrogator according to an embodiment.

FIG. 2 is a block diagram of the interrogator 100 according to an embodiment.

Referring to FIG. 2, the interrogator 100 may include a signal generator 110 configured to generate an interrogation signal, a signal splitter 115 configured to split a signal generated by the signal generator 110, and a demodulation unit 120 configured to demodulate a received tag signal.

The signal generator 110 may generate an interrogation signal by repeating, N times, a chirp signal that changes in frequency from f1 to f2 for a unit time period T. Here, an interrogation signal s(t) may be determined based on Equation 1 below.

$$s(t) = c(t) * \sum_{n=1}^{N} \delta(t - nT) \qquad \text{[Equation 1]}$$

In Equation 1, c(t) denotes a chirp signal, and, for example, the frequency of the chirp signal may increase linearly from f1 to f2 during T. However, this is only an example, and the chirp signal is not limited to the above-described example. In addition, the values of T, f1, f2, and N may be set according to a channel environment in which communication is performed, or performance required in a wireless communication system.

The interrogation signal may be split into first and second partial interrogation signals by the signal splitter 115, and the first partial interrogation signal may be transmitted to the backscatter tag 200 through an antenna.

The second partial interrogation signal separated by the signal splitter 115 may be transmitted to the demodulation unit 120. The demodulation unit 120 may include a mixer 122, a low-pass filter (LPF) 124, and a fast Fourier transform (FFT) unit 126. In the mixer 122, the second partial interrogation signal separated by the signal splitter 115 may be mixed with a tag signal received by the interrogator 100. The mixed signal may be transmitted to the FFT unit 126 through the LPF 124, and the FFT unit 126 may perform a Fourier transform on the signal having passed through the LPF 124. The above-described components are only examples, and the interrogator 100 does not necessarily include all of the above-described components. According to another example, a filter other than the LPF 124 may be included in the demodulation unit 120.

In addition, according to an embodiment not illustrated, the interrogator 100 may further include a power amplifier. The interrogation signal may be amplified by the power amplifier (not shown) and then transmitted through an antenna.

Also, according to another embodiment, the interrogator 100 may include a transceiver, a processor, and a memory. According to embodiments, the transceiver, the processor, and the memory of the interrogator 100 may operate according to a communication method of the interrogator 100. However, the components of the interrogator 100 are not limited to the above-described examples. For example, the interrogator 100 may include more or fewer components than the above-described components. In addition, the processor, the transceiver, and the memory may be implemented as a single chip.

The transceiver collectively refers to a receiver of the interrogator 100 and a transmitter of the interrogator 100, and may transmit and receive a signal to and from a backscatter tag, a base station, or a network entity. To this end, the transceiver may include a radio frequency (RF) transmitter for up-converting and amplifying a frequency of a signal being transmitted, and an RF receiver for low-noise-amplifying a received signal and down-converting a frequency of the received signal. However, this is merely an example of the transceiver, the components of which are not limited to the RF transmitter and the RF receiver.

In addition, the transceiver may include a wired/wireless transceiver, and may include various components for transmitting and receiving signals. Also, the transceiver may receive a signal through a radio channel, output the signal to the processor, and transmit, through a radio channel, a signal output from the processor.

The memory may store a program and data necessary for the operation of the interrogator 100. Also, the memory may store control information or data included in a signal obtained by the interrogator 100. The memory may be a storage medium, such as read-only memory (ROM), random-access memory (RAM), a hard disk, a compact disc ROM (CD-ROM), or a digital video disc (DVD), or a combination of storage media.

The processor may control a series of processes such that the interrogator 100 operates according to the above-described embodiment. The processor may include one or more processors. For example, the processor may include a communication processor (CP) for performing control for communication and an application processor (AP) for controlling a higher layer, such as an application program.

Figure 3A:
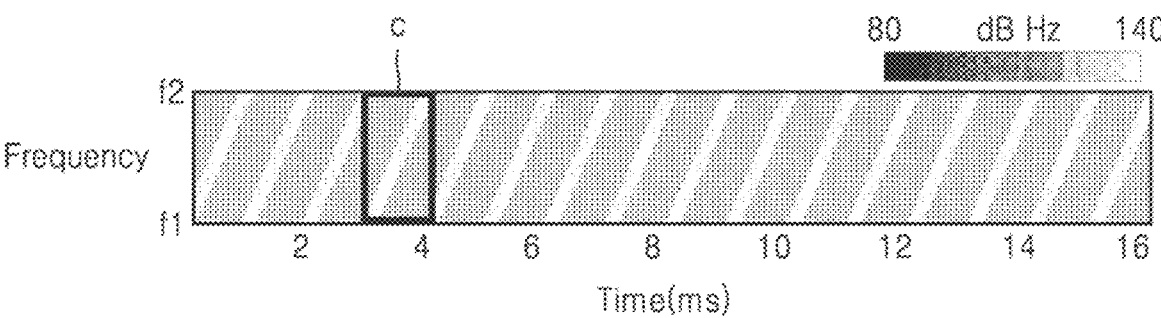
FIG. 3A is a diagram for describing a change in the frequency of an interrogation signal provided by an interrogator over time.

FIG. 3A is a diagram for describing a change in the frequency of the interrogation signal IS provided by the interrogator 100 over time.

Referring to FIG. 3A, it may be seen that the interrogation signal is composed of a repetition of a chirp signal C that linearly changes in frequency for a unit time period. In the embodiment illustrated in FIG. 3A, the frequency of the unit chirp signal C linearly increases from a first frequency f1 to a second frequency f2. However, according to an embodiment not illustrated, the frequency of the unit chirp signal may nonlinearly increase from the first frequency to the second frequency. In addition, according to an embodiment not illustrated, the frequency of the unit chirp signal C may linearly decrease from the first frequency f1 to the second frequency f2, and according to another embodiment, the frequency of the unit chirp signal C may nonlinearly decrease from the first frequency to the second frequency.

The difference between the first frequency f1 and the second frequency f2 may correspond to the bandwidth of a band to be used. In an embodiment, the first frequency f1 and the second frequency f2 may constitute a bandwidth of 250 MHz with respect to the center frequency in the 24-GHz band among millimeter-wave bands of tens to hundreds of GHz frequency bands. In another embodiment, the first frequency f1 and the second frequency f2 may constitute a bandwidth of 14 GHz with respect to the center frequency of 60 GHz in a millimeter-wave band.

Figure 3B:
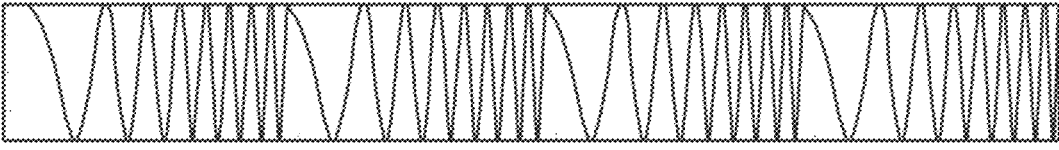
FIG. 3B is a diagram illustrating the amplitude of an interrogation signal over time.

FIG. 3B is a diagram illustrating the amplitude of the interrogation signal IS over time. As illustrated in FIG. 3B, the unit chirp signals C constituting the interrogation signal IS may be connected to each other such that the phase is continuous.

As will be described below, the number of unit chirp signals C constituting the interrogation signal IS, the amount of change in the frequency of the unit chirp signal C over time, and the duration of the unit chirp signal C may be controlled according to a communication environment.

Figure 4:
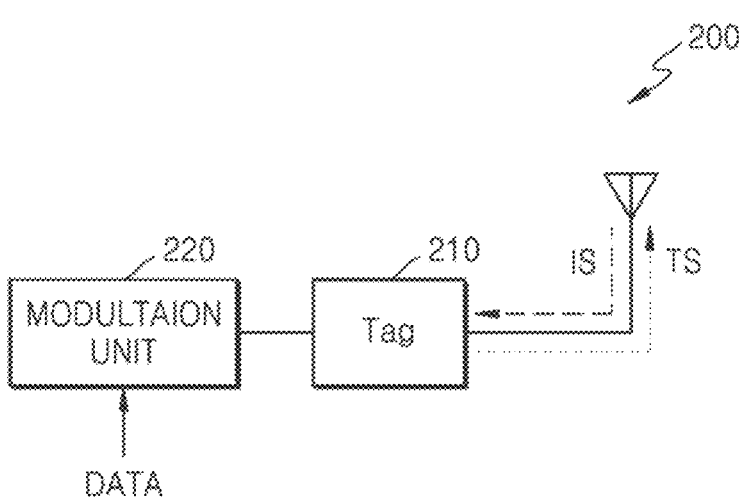
FIG. 4 is a block diagram of a backscatter tag according to an embodiment.

FIG. 4 is a block diagram of the backscatter tag 200 according to an embodiment.

Referring to FIG. 4, the backscatter tag 200 may include an antenna 210 configured to receive the interrogation signal IS and output the tag signal TS, and a modulation unit 220 configured to frequency-modulate the received interrogation signal IS. In an embodiment, through the antenna 210, the interrogation signal IS may be received, and the tag signal TS generated by modulating the frequency of the interrogation signal IS with data provided to the backscatter tag 200 may be transmitted. In an embodiment, the antenna 210 may be implemented as all types of antennas, such as a Van Atta array, a phased array antenna, or a waveguide antenna.

The modulation unit 220 may modulate the interrogation signal IS into a desired frequency by adjusting the impedance of the antenna through impedance switching, so as to generate the tag signal TS. For example, the backscatter tag 200 may generate the tag signal TS by performing impedance switching at a frequency fm to modulate the interrogation signal IS.

In an embodiment, the backscatter tag 200 may be included in an Internet-of-Things (IoT) device (not shown), and the interrogation signal IS may be frequency-modulated with data DATA collected by the IoT device and then provided to the interrogator 100. The IoT device (not shown) may include an energy harvesting device, and may drive the backscatter tag 200 with power collected by the energy harvesting device.

Figure 5:
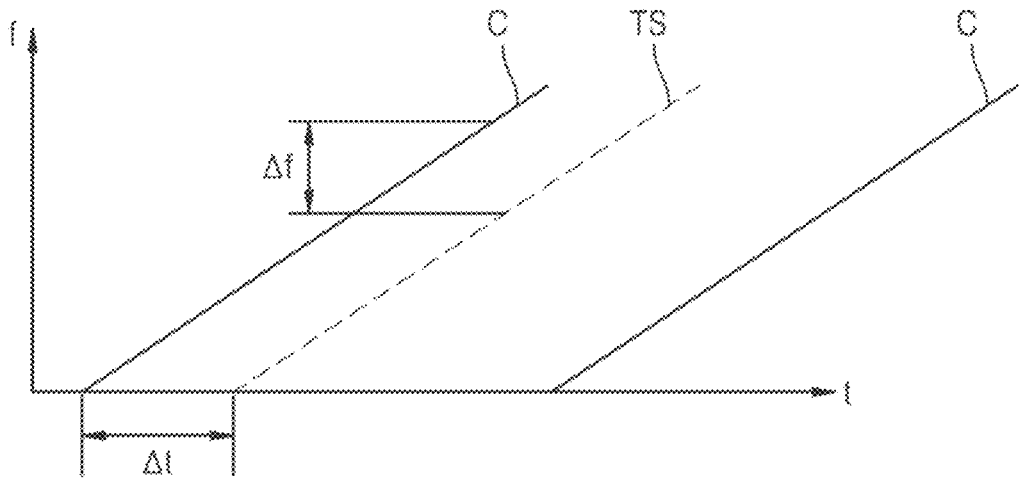
FIG. 5 is a diagram illustrating a unit chirp signal included in an interrogation signal that is split off by a signal splitter, and a tag signal received by an interrogator, according to an embodiment.

FIG. 5 is a diagram illustrating the unit chirp signal C included in the interrogation signal IS that is split off by the signal splitter, and the tag signal TS received by the interrogator 100, according to an embodiment.

The tag signal TS received by the interrogator 100 is a signal provided by the backscatter tag 200 reflecting the interrogation signal IS.

The mixer 122 may be provided with the received tag signal TS and the interrogation signal IS that is split off by the signal splitter, and mix the two signals to generate an intermediate signal IF. The intermediate signal IF is generated by multiplying the tag signal TS by the interrogation signal IS, and is splittable into a signal having a frequency component corresponding to the sum of the frequencies of the two signal, and a signal having a frequency component corresponding to the difference between the frequencies of the two signals.

The signal having the frequency component corresponding to the sum of the frequencies of the tag signal TS and the interrogation signal IS may be filtered out by the LPF 124. On the contrary, the signal having the frequency component corresponding to the difference between the frequencies of the tag signal TS and the interrogation signal IS may be provided to the FFT unit 126. In an embodiment, the FFT unit 126 may perform a discrete fast Fourier transform on an input signal.

Between the interrogation signal IS and the tag signal TS, there is a time difference Δt corresponding to a moving distance of the interrogation signal IS and a moving distance of the tag signal TS. As the time difference Δt increases, a frequency difference Δf between the two signals increases. That is, it may be seen that the frequency of the tag signal TS received and modulated by the interrogator 100 includes not only a frequency component modulated by the backscatter tag 200 but also a frequency component corresponding to the distance between the interrogator 100 and the backscatter tag 200.

In the present embodiment, a channel may be allocated to a tag according to the distance between the backscatter tag 200 and the interrogator 100, without a separate modification. As such, frequency-division multiple access without adjustment over the entire millimeter wave bandwidth is possible without incurring overhead in the backscatter tag 200 and the interrogator 100.

Figure 6:
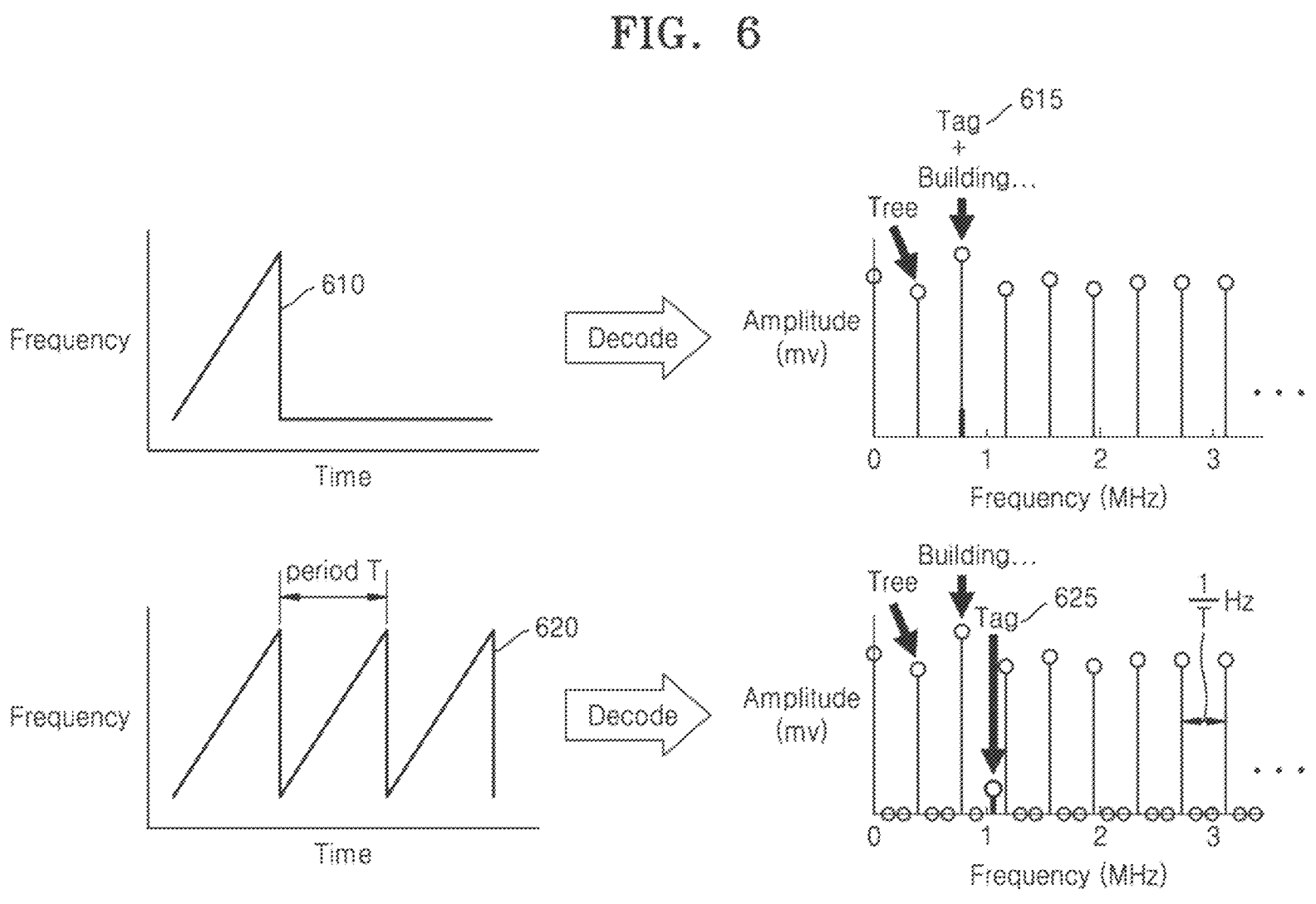

FIG. 6 is a diagram for describing decoding characteristics of an interrogation signal composed of one unit chirp signal and an interrogation signal composed of a repetition of a chirp signal according to an embodiment.

FIG. 6 illustrates a tag signal 615 generated from an interrogation signal 610 composed of one unit chirp signal, and a tag signal 625 generated from an interrogation signal 620 composed of a plurality of unit chirp signals.

Due to the characteristics of a Fourier transform for a periodic signal including a signal component and a noise component, a result of the Fourier transform is in a discrete frequency domain. In the result, clutter noise is in a noise bin NB, and a demodulated tag signal component is in a tag bin TB.

The clutter noise may be expressed as Equation 2 below.

$$\underbrace{\sum_n s(t - \Delta t_n)}_{period\ T} \qquad \text{[Equation 2]}$$

Clutter noise may occur through signals being reflected from a plurality of surrounding objects. Equation 2 represents the sum of n signals reflected from a plurality of surrounding objects, and $t_n$ corresponds to a propagation delay until the signal is returned after being reflected from the n-th surrounding object. In Equation 2, all n signals have a period T, and the clutter noise composed of the sum of the n signals also has the period T.

The tag signal 615 generated from the interrogation signal 610 composed of one unit chirp signal has a frequency of a multiple of 1/T. Accordingly, in a case of the interrogation signal 610 composed of one unit chirp signal, the tag signal is obtained as overlapping the clutter noise signal, thus, the SNR performance is significantly deteriorated, and it may be difficult to decode data.

On the contrary, in a case of the interrogation signal 620 composed of the repetition of the unit chirp signal, the tag signal 625 has a frequency that is exclusive of multiples of 1/T. The tag signal obtained from the interrogation signal 620 composed of the repetition of the unit chirp signal may be expressed as Equation 3 below.

$$\underbrace{s(t - \Delta t_{tag})}_{period\ T} \cdot \underbrace{e^{j2\pi f_{tag}t}}_{period\ \frac{1}{f_{tag}}} \qquad \text{[Equation 3]}$$

Referring to Equation 3, it may be confirmed that the period of the tag signal according to an embodiment is not T. Accordingly, the tag signal according to an embodiment may be separated from a clutter noise signal, and thus, the SNR may be improved.

Figure 7A:
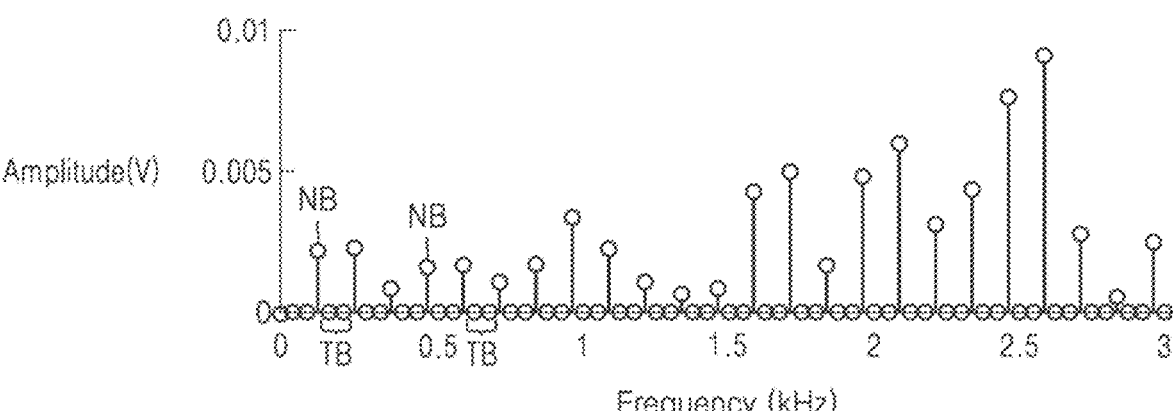
FIG. 7A is a diagram illustrating a noise bin in which clutter noise is located and, a tag bin in which tag signals are located, in a frequency domain.

FIG. 7A is a diagram illustrating the noise bin NB in which clutter noise is located and, a tag bin NB in which tag signals are located, in the frequency domain.

Referring to FIG. 7A, as described above, the unit chirp signals C constituting the interrogation signal IS are periodic signals connected to each other such that the phase is continuous. Due to the characteristics of a Fourier transform for a periodic signal including a signal component and a noise component, a result of the Fourier transform is in a discrete frequency domain. The result is in a particular frequency domain called a bin. In the result, clutter noise is in the noise bin NB, and a demodulated tag signal component is in the tag bin TB. The noise bin NB and the tag bin TB do not overlap each other in the frequency domain.

In the embodiment illustrated in FIG. 7A, two tag bins TB and one noise bin NB are periodically repeated. This example corresponds to a case in which three consecutive unit chirp signals constitute the interrogation signal IS. That is, when N consecutive unit chirp signals constitute the interrogation signal IS, (N−1) tag bins and one noise bin are formed.

The power of the clutter noise is concentrated on noise located in the noise bin NB, and the power of the noise component in the (N−1) tag bins TB is low. Accordingly, even when the power of a signal in the tag bin TB provided by modulation by the backscatter tag 200 is low, the signal may be detected with a high SNR.

Figure 7B:
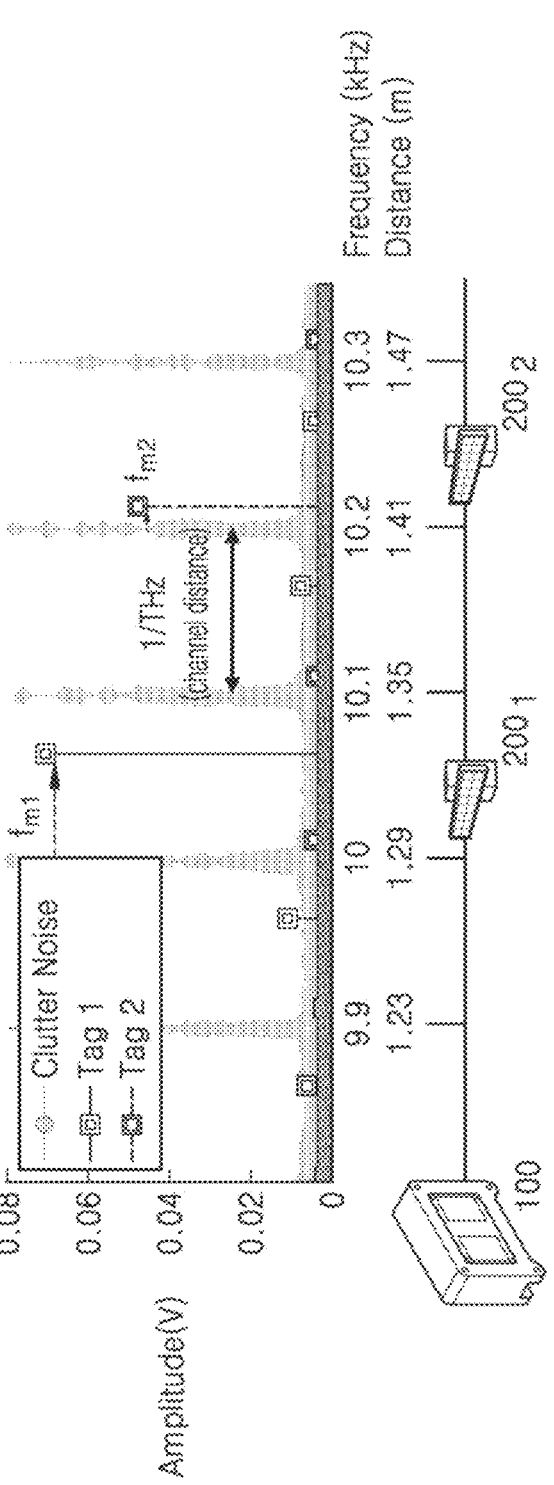
FIG. 7B is a diagram illustrating signals reflected by two backscatter tags that are spaced different distances from an interrogator, in a discrete frequency domain.

FIG. 7B is a diagram illustrating signals reflected by two backscatter tags that are spaced different distances from the interrogator 100, in a discrete frequency domain.

Referring to FIG. 7B, the tag signals reflected by a first backscatter tag $200_1$ and a second backscatter tag $200_2$, respectively, are in a bin on a frequency, which is determined by the sum of the frequency corresponding to the respective distances between them and the interrogator 100, and the frequency modulated by each backscatter tag. For example, in a case in which the first backscatter tag $200_1$ modulates the interrogation signal IS with the frequency fm1, a tag signal may be formed on a frequency determined by the sum of a frequency corresponding to the distance between the first backscatter tag $200_1$ and the interrogator 100, and the frequency fm1. For distance being the distance between each backscatter tag and the interrogator 100, the frequency corresponding to the distance between the first backscatter tag $200_1$ and the interrogator 100 is $$\frac{1}{T}\ \text{Hz} \times \frac{distance}{\left(\frac{c}{2BW}\right)}.$$

Clutter noise may be formed at $$\frac{1}{T}\ \text{Hz} \times \frac{distance}{\left(\frac{c}{2BW}\right)},$$

which is the frequency corresponding to the distance between the first backscatter tag $200_1$ and the interrogator 100, and the tag signal and the clutter noise may be formed to be spaced fm1 from each other. In the interrogator frequency domain, the tag signal may be formed to be spaced from the clutter noise by the sum of the frequency of fm1 and the frequency corresponding to the distance between the tag and the interrogator. The tag signal of the first backscatter tag $200_1$ may be formed to be spaced apart by fm1 in the frequency domain. In addition, according to the same principle as described above, in a case in which the second backscatter tack $200_2$ modulates the interrogation signal IS with a frequency fm2, the tag signal of the second backscatter tag $200_2$ may be formed to be spaced apart from the clutter noise by fm2 in the frequency domain.

The demodulation unit 120 (see FIG. 2) may filter out signals corresponding to the noise bin NB from an output of the Fourier transform by using a filter, and find and demodulate a signal greater than a noise level among signals in the frequency domain of the tag bin TB.

In the embodiment illustrated in FIG. 7B, the backscatter tag 200 may multiply the interrogation signal IS by a certain frequency to generate the tag signal TS. In this case, the tag signal TS ideally needs to be expressed in one tag bin TB, however, in practice, spectral leakage may occur, and thus, signals may be generated in J (generally J=4) surrounding tag bins TB. The signals in the J tag bins TB are all generated by multiplying the interrogation signal IS by the same frequency, and are spaced the same size from the noise bin NB. That is, all J signals generated in one tag have the same frequency difference from an adjacent noise bin.

Therefore, even in a non-ideal case in which spectral leakage occurs, N FFT peaks having the same difference from the noise bin NB may be interpreted as signals from one tag, rather than as N tags.

That a tag signal is generated to be spaced apart from a clutter noise signal may be equally applied even in a case in which a tag moves. Even in a case in which the position of the tag bin TB in the frequency domain is changed by the movement of the backscatter tag, a signal generated in the moving tag is spaced the same frequency difference from an adjacent noise bin NB. Accordingly, it is possible to track and demodulate a tag signal even in a situation in which the backscatter tag 200 is moving.

As the number of unit chirp signals included in the interrogation signal IS is increased, the number of tag bins TB in which tag signals provided by the backscatter tag 200 is located increases. Accordingly, in a case in which communication is performed by using an interrogation signal according to an embodiment, large-scale communication between one interrogator 100 and a plurality of backscatter tags 200 is possible.

Figure 8:
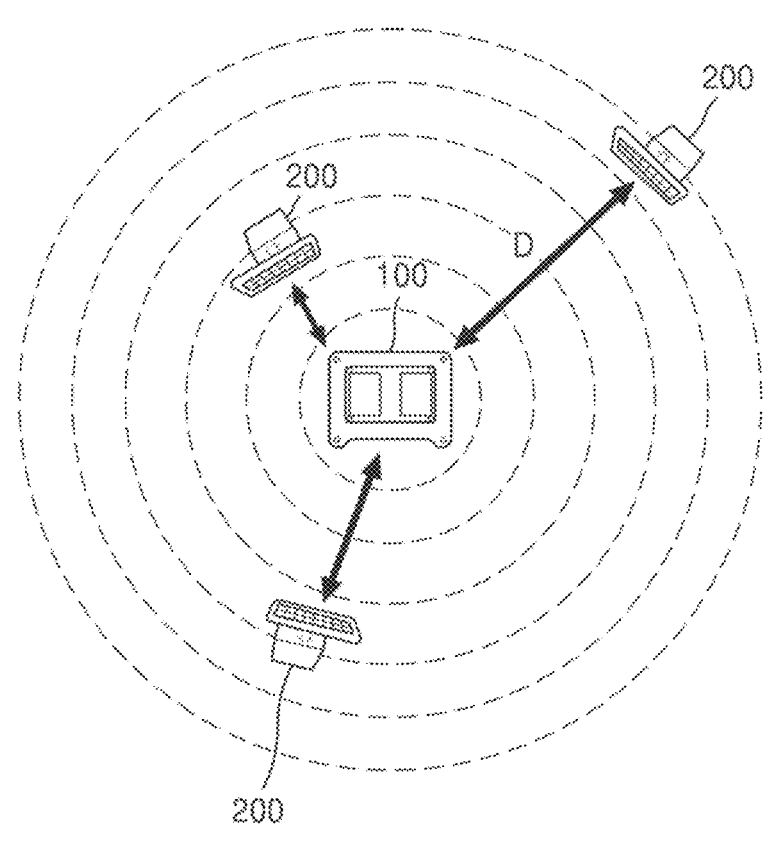
FIG. 8 is a diagram illustrating channel allocation according to the distance between an interrogator and each of backscatter tags.

FIG. 8 is a diagram illustrating channel allocation according to the distance between an interrogator and each of backscatter tags.

Referring to FIG. 8, in the present embodiment, channels may be divided into noise bins representing a channel width of 1/T Hz (T: the period of a unit chirp signal) and an inter-channel distance in $$\frac{c}{2BW} \text{ m}$$

(BW: the frequency difference in a unit chirp signal, c: the speed of light). Backscatter tags 210, 220, and 230 may be allocated to channels generated according to the distance between the interrogator 100 and the backscatter tags 210, 220, and 230, respectively.

The backscatter tag (e.g., 210) may modulate data by using a frequency-shift keying (FSK) scheme, within a channel width of 1/T Hz for channel access, without information about the allocated channel. In this case, the data may be provided from a device connected to the backscatter tag (e.g., 210) or a device including the backscatter tag. The backscatter tag (e.g., 210) may reflect and thus provide the modulated tag signal TS to the interrogator 100.

As described above, even in a case in which the backscatter tags 210, 220 and 230 that modulate and reflect the interrogation signal IS at the same frequency are arranged around the interrogator 100 that provides the interrogation signal IS, when the distances between the backscatter tags 210, 220 and 230 and the interrogator 100 are different from each other, the frequencies of signals received and demodulated by the interrogator 100 are different from each other.

In the present embodiment, according to a maximum distance D among the distances between the backscatter tags 210, 220 and 230 and the interrogator 100, utilization of a millimeter-wave bandwidth may be performed as in an example below. As illustrated in FIG. 3A, the interrogator 100 outputs an interrogation signal composed of consecutive unit chirp signals C, and the backscatter tag 200 frequency-modulates the unit chirp signals C and reflects the modulated unit chirp signals C. As described above with reference to FIG. 5, the time difference Δt may be between the interrogation signal IS and the tag signal TS.

The bandwidth may be utilized by controlling the period (i.e., the duration) of the unit chirp signal and the slope of the unit chirp signal such that the time difference Δt is within the period of the chirp signal C. In this case, the period of the unit chirp signal may be calculated according to $$T = \frac{2D}{c}$$

(D: the maximum distance between the backscatter tags and the interrogator, c: the speed of light, T: the period of the chirp signal).

Because the related-art backscatter technology has a significantly limited power budget, a backscatter device does not have an oscillator or is equipped with a low-quality local oscillator of the range of up to several tens of MHz. Therefore, in general, backscatter frequency modulation has not been able to utilize the entire millimeter-wave spectrum of the range of hundreds to thousands of MHz.

However, according to the present embodiment, the entire bandwidth may be utilized by optimizing channel utilization, the maximum scalability may be achieved by maximizing the tag bin TB of a channel, and simultaneous communication with all nodes of a network is possible. Therefore, as such, a wide millimeter-wave band may be utilized as a communication band between a plurality of backscatter tags 210, 220, 230 and the interrogator 100.

The number of channels generated by distance-based channel allocation may vary depending on bandwidth. For example, a 14-GHz bandwidth at 60 GHz ISM band may obtain up to 4600 channels for the maximum separation distance D=50 m between the backscatter tag 200 and the interrogator 100, however, for the same maximum separation distance, the number of channels of a 250-MHz bandwidth at 24 GHz ISM band has is limited to 80.

Similarly, the inter-channel distance by which two different backscatter tags (e.g., 210 and 220) needs to be spaced apart from each other to occupy different channels may also vary. At a center frequency of 60 GHz ISM Band, the inter-channel distance is 10.7 mm, whereas, at a center frequency of 24 GHz ISM Band, the inter-channel distance is 600 mm.

That is, the number of channels and the inter-channel distance depend on bandwidth and cannot be controlled, and allocating a channel to a single tag may not provide sufficient scalability for a dense network. This may require a multi-channel access mechanism configurable across several tags to support different scalability requirements in a wide range of settings including various spectral bands and network densities.

In the present embodiment, the number of tag bins TB may be freely adjusted by controlling the number of unit chirp signals C included in the symbols of the interrogation signal IS, and thus, multi-channel access may be performed. The increased number of tag bins TB provides a space for simultaneously expressing more tag signals, and thus increases the scalability.

The present embodiment provides multi-channel access without adjustment by allowing the backscatter tag 200 to access a series of bins (e.g., sub-channels) with bits containing a corresponding tag identifier (ID). As such, it is possible to prevent signal collisions throughout the network.

In the present embodiment, the number of unit chirp signals included in a symbol is configured such that the number of bits per symbol is greater than the tag ID space. In particular, N chirps per symbol (=log N bits per symbol) scales to (N−1)/2 tags in 2-FSK. When the number of tag bins TB is increased, the symbol duration is increased, resulting in a lower throughput. That is, chirps increase from N to N', the throughput of a 2-FSK tag decreases by N/N'.

In the present embodiment, as will be described below, even when the backscatter tag 200 moves, it is possible to seamlessly communicate with the interrogator 100 without an additional fundamental design. As the backscatter tag 200 moves, the distance to the interrogator 100 changes, and accordingly, the backscatter tag 200 may traverse multiple channels within a symbol duration.

Unlike a case in which the backscatter tag 200 is fixed, the moving backscatter tag 200 may have more than four spectral leaks and thus extend to several channels. However, unlike a fixed tag, the interrogator 100 may increase the frequency domain for demodulating a signal provided by the moving tag, according to the moving speed of the backscatter tag 200, to a value greater than 4, to perform communication.

Figure 9A:
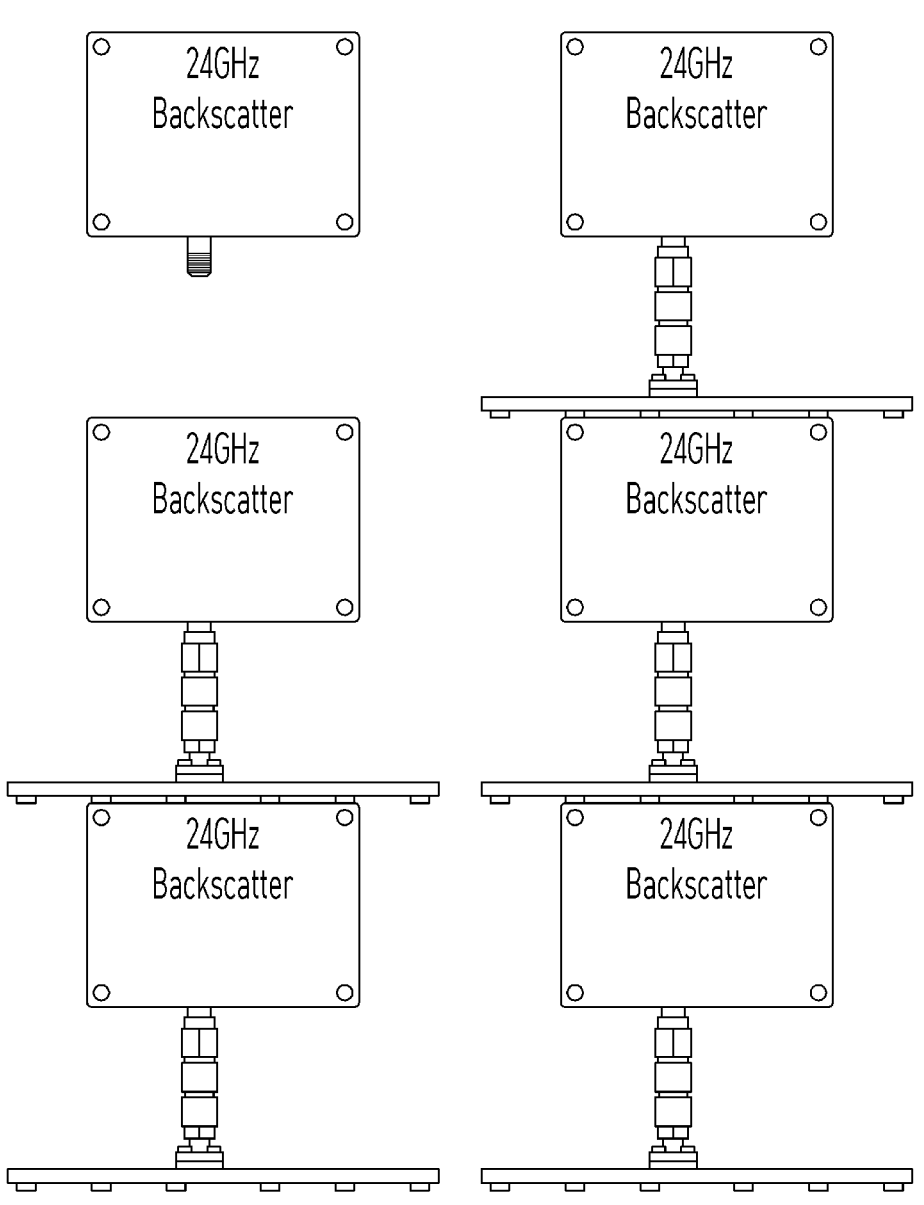
FIG. 9A is a diagram illustrating a prototype of a backscatter tag accommodated in an aluminum casing.
Figure 9B:
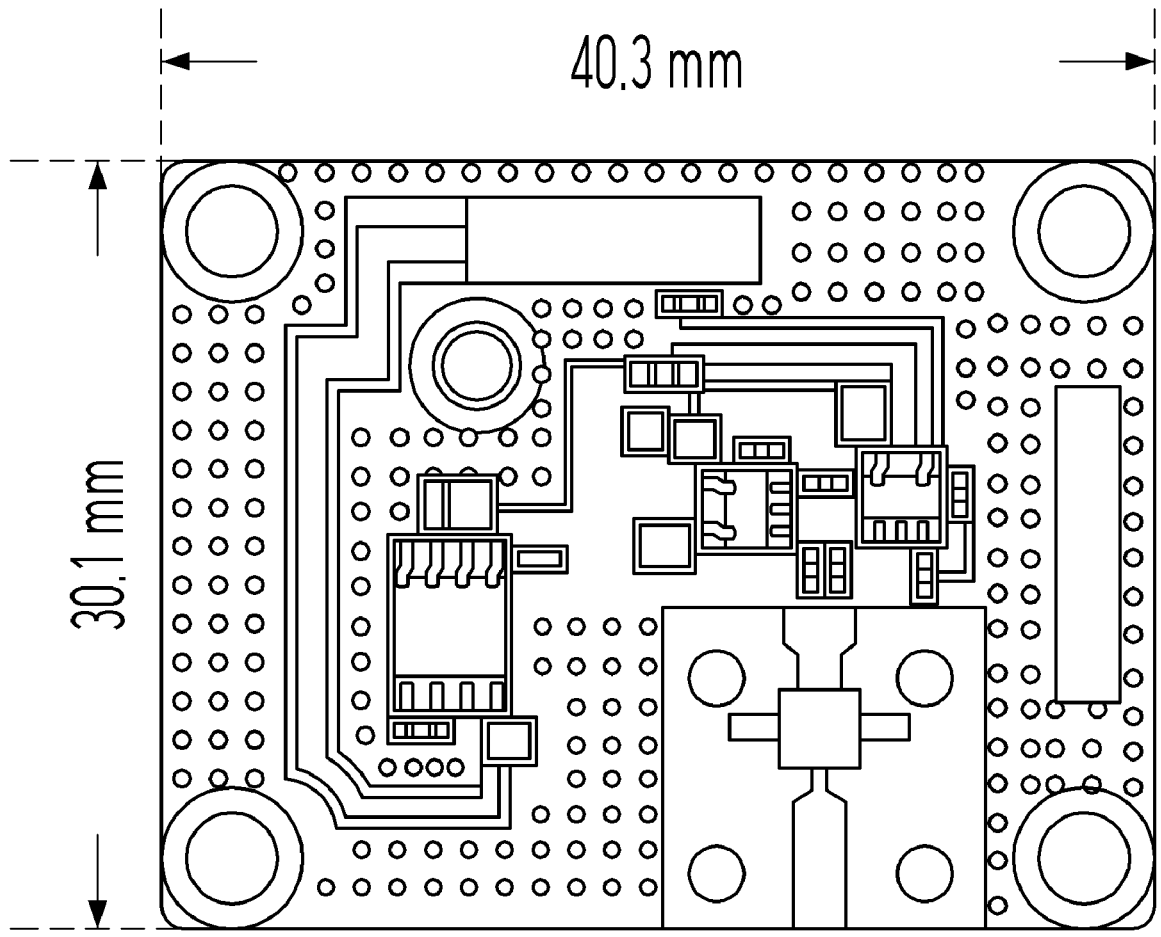
FIG. 9B is a diagram illustrating a substrate of a backscatter tag.

FIG. 9A is a diagram illustrating a prototype of a backscatter tag accommodated in an aluminum casing. In addition, FIG. 9B is a diagram illustrating a substrate of a backscatter tag. In addition, FIG. 9C is a diagram illustrating a reflection coefficient (S11) of the substrate of the backscatter tag with a switch closed.

Figure 9C:
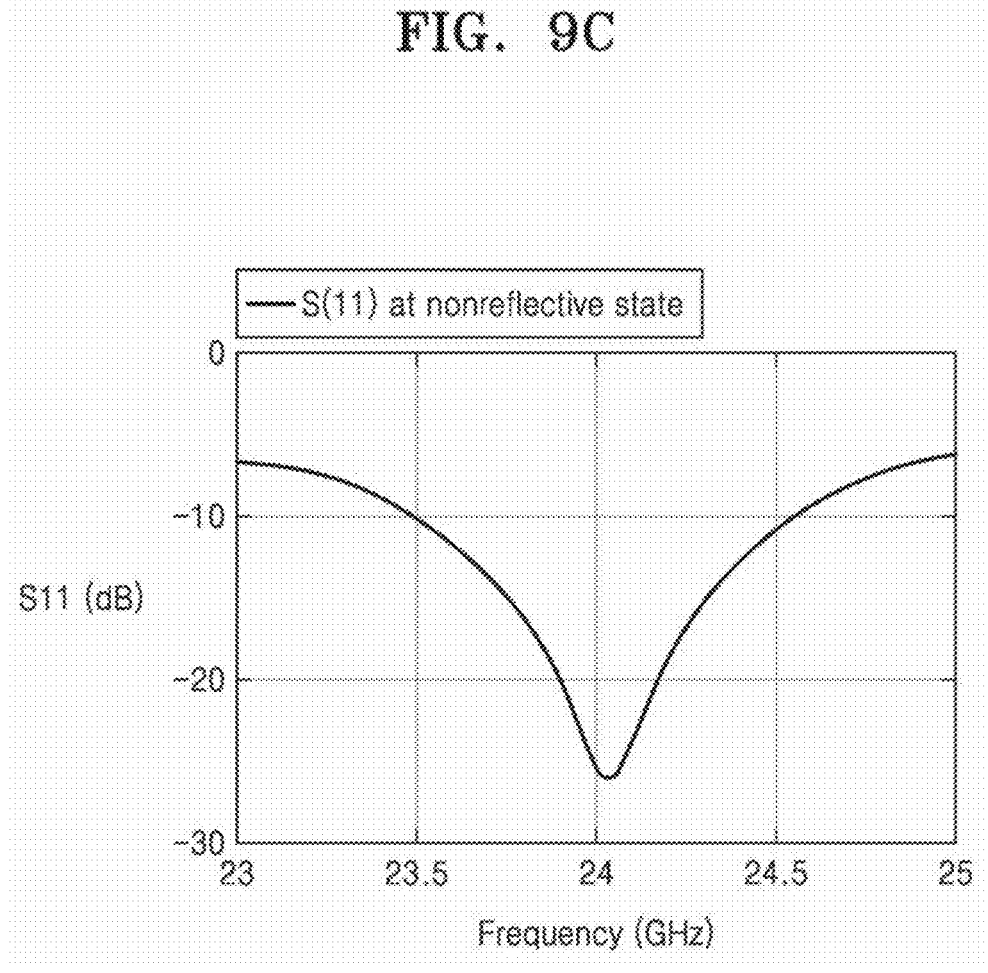
FIG. 9C is a diagram illustrating a reflection coefficient (S11) of a substrate of a backscatter tag with a switch closed.

Referring to FIGS. 9A to 9C, the prototype of the backscatter tag was fabricated on a Rogers RO4003C substrate with a MACOM MASW-011105 GaAs SPDT RF switch. An RFC port of the switch is connected to a commercial 24-GHz 17-dBi microstrip array antenna with a 2.92-mm connector, and RF1/RF2 ports are connected to 50-Ω matched ground and open (infinite impedance), respectively.

The present embodiment was evaluated by using a total of six tags. FIG. 9C is a diagram illustrating a result of measuring a return loss (S11) of a tag in a nonreflective state (i.e., matched ground) at 24 GHz. All of the backscatter tags exhibit a return loss of flat −9.5 dB in the reflective state, resulting in a total return loss difference of 20 dB or greater between the switch states at 24 GHz. For the experiment, a tag control signal was provided to a TerasIC T-Core P0633 FPGA board powered by an Altera MAX-10 chip, or an Arduino Uno board. The size of the tag is 51.2 mm×41.7 mm with the aluminum case of the tag, and 40.3 mm×30.1 mm without the case.

The prototype of the backscatter tag uses a MACOM RF switch operating at a typical power consumption of 5 μW with a separate control board. For power consumption analysis, a ring oscillator and a modulator circuit with a power consumption of 2 μW was used for frequency shift and control logic, and a total of 7 μW was consumed by the backscatter tag of the present embodiment. Because it is known that 100 μW of power may be collected by using energy harvesting, the backscatter tag of the present embodiment may operate without a battery. As another example, the backscatter tag may operate for 24.5 years with a coin-type coin cell (1000 mAh) battery.

Figure 10A:
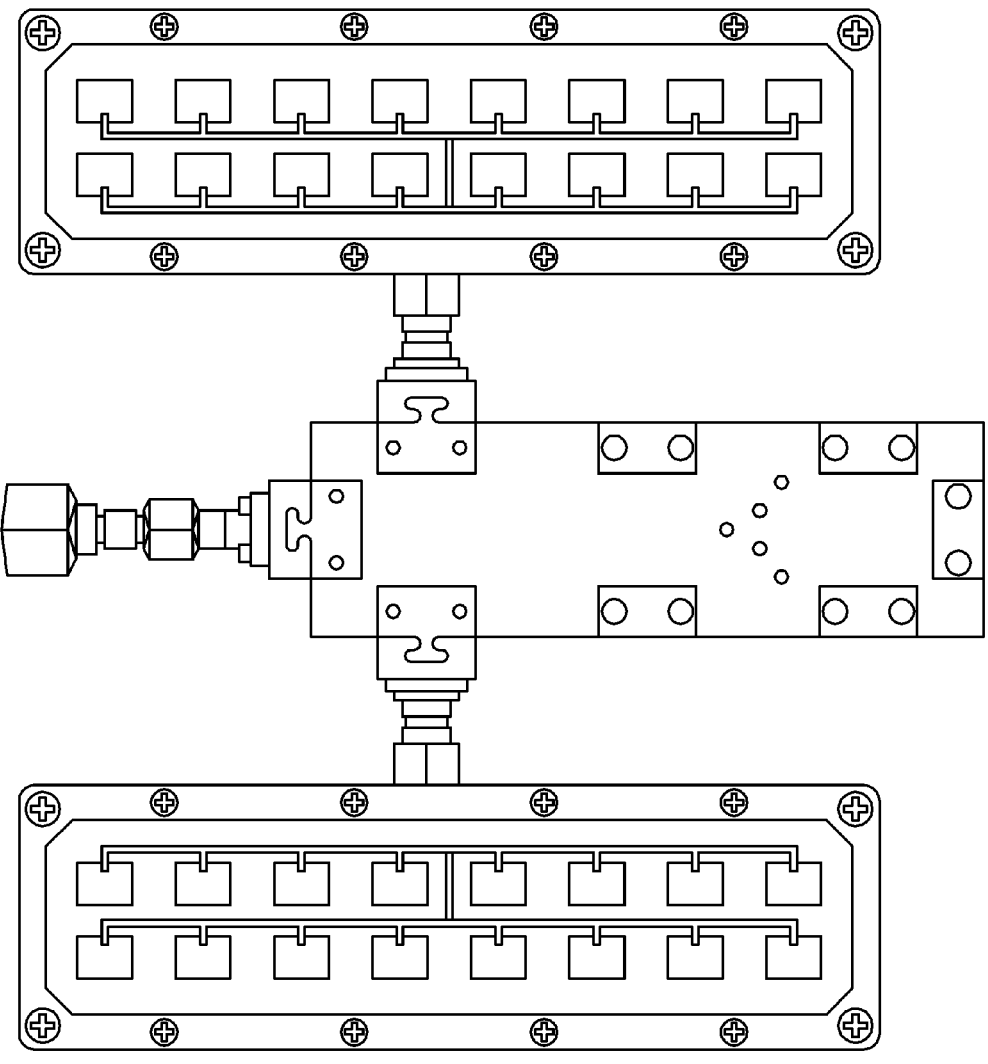
FIG. 10A is a diagram illustrating a prototype of a backscatter tag implemented with a Van Atta array.
Figure 10B:
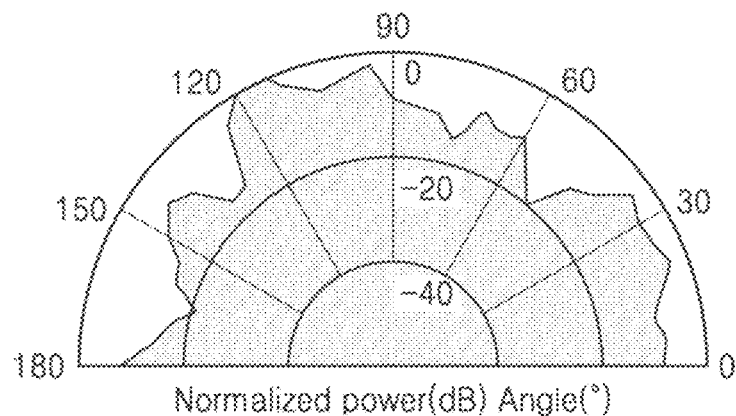
FIG. 10B is a diagram illustrating a result of measuring a beam pattern of a tag prototype with normalized power.
Figure 10C:
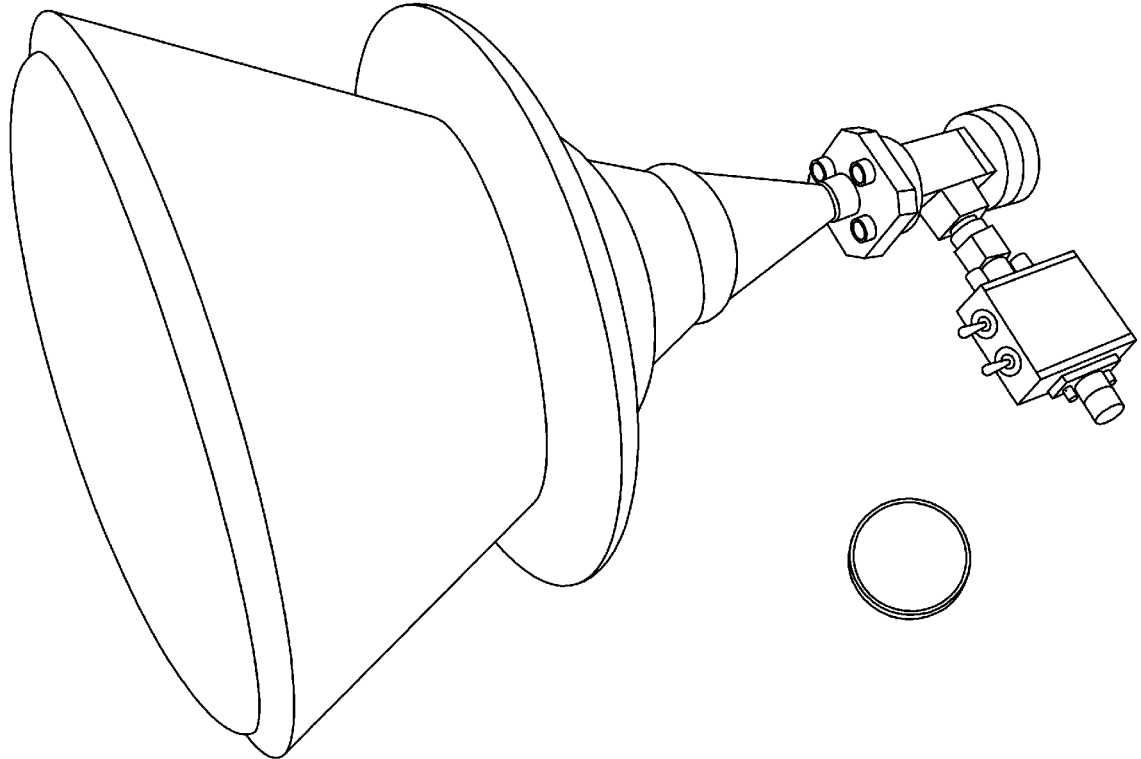
FIG. 10C is a diagram illustrating a prototype of a backscatter tag implemented in an Industrial, Scientific and Medical (ISM) band of 60 GHz.

FIG. 10A is a diagram illustrating a prototype of a backscatter tag implemented with a Van Atta array. FIG. 10B is a diagram illustrating a result of measuring a beam pattern of a tag prototype with normalized power, and FIG. 10C is a diagram illustrating a prototype of a backscatter tag implemented in an Industrial, Scientific and Medical (ISM) band of 60 GHz. Referring to FIGS. 10A and 10B, the backscatter tag is based on an Analog Devices EVAL-ADRF5026 switch evaluation board, with RFC and RF1 ports connected to the same commercial 24-GHz antenna and an RF2 port connected to 50 matched ground. T-Core P0633 FPGA or Arduino Due was used to control the prototype tag using a Van Atta array. The pattern illustrated in FIG. 10B shows a retroreflection of −20 dB or greater over the full 180 degrees of incident angle.

Referring to FIG. 10C, the backscatter tag was further implemented and evaluated in the 60-GHz ISM band. As illustrated, the 60-GHz tag is based on a V-Band Reflective SPST PIN diode switch (Eravant), where one end of the switch is connected to a WR-15 Waveguide Horn Antenna (Pasternack). The other end of the switch is connected to WR-15 WAVEGUIDE OPEN (Eravant) to achieve S(11) appropriate for a tag operation. A transistor-transistor logic (TTL) signal of the 60-GHz tag was provided to T-Core P0633 FPGA or Arduino Due.

The interrogator of the present embodiment was implemented with a software-defined radio (SDR)-based custom reader and three commercial radars. The custom reader uses two USRP X310s for a signal transmitter and receiver. Each X310 is connected to EVAL-ADMV1013 and EVAL-ADMV1014 (Analog Devices), which act as signal up-converters and down-converters for a 24-GHz RF. A 6-GHz external local oscillator signal is supplied to a converter by using a USRP B210, and then supplied to a signal mixer at a frequency of 24 GHz via an internal quadrupler on a converter board. SDR implemented an interrogator by generating and processing a continuous phase chirp signal.

A 24-GHz reader was implemented by using Distance2Go (Infineon) and EVALTinyrad (Analog Devices), which are commercial radars, and a 60-GHz reader was implemented by using TI mmWaveICBoost, IWR6843ISK and DCA1000EVM, as a set. All of the radars provide an interface for receiving raw data regarding chirp demodulation results in real time, and options for a user to define and parameters, such as the duration of a unit chirp signal, the interval between unit chirp signals, or the bandwidth and transmission power of a unit chirp signal.

In order to implement the interrogator with the commercial radars, the transmission time between chirps was accurately calculated, and then the corresponding phase offset was compensated for by reconstructing chirp data over time. Therefore, the unit chirp signals were connected to each other with zeros therebetween to correctly reflect the chirp phase. The time difference between chirps may be easily calculated by using user-defined chirp parameters.

Figure 11A:
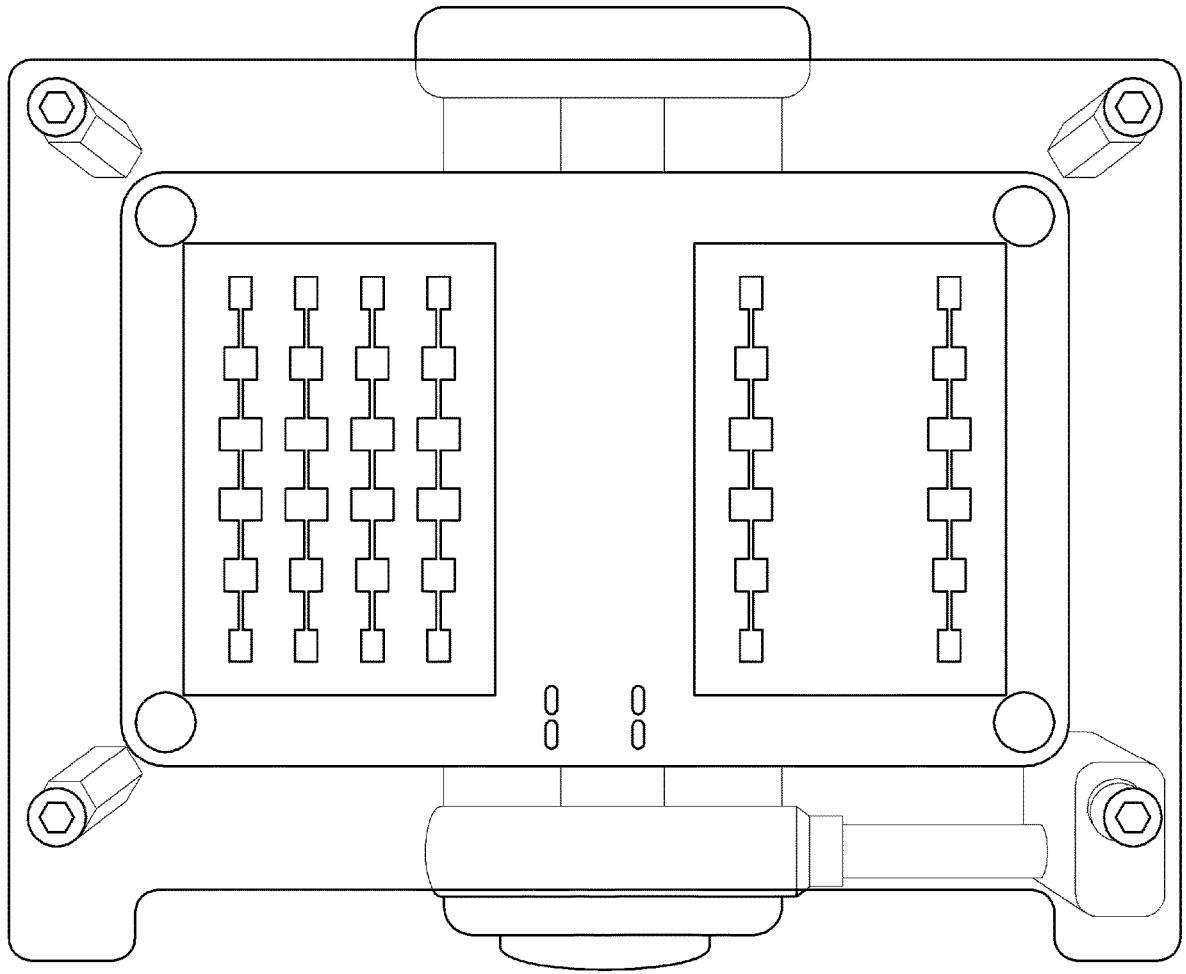
FIG. 11A is a diagram illustrating a reader implemented with an EVAL-Tinyrad commercial radar.
Figure 11B:
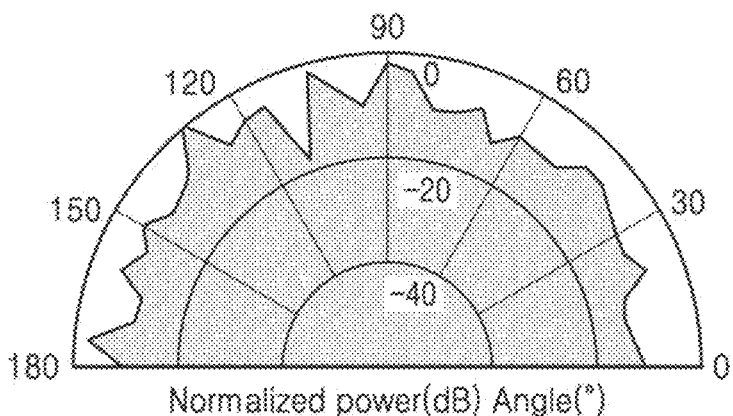
FIG. 11B is a diagram illustrating beam characteristics of an omnidirectional antenna of a TX antenna.

FIG. 11A is a diagram illustrating a reader implemented with an EVAL-Tinyrad commercial radar, and FIG. 11B is a diagram illustrating beam characteristics of an omnidirectional antenna of a TX antenna. Referring to FIGS. 11A and 11B, the radar was configured to use a single Tx antenna and a single Rx antenna for omnidirectional communication. The radar was configured to have a maximum transmission power of 8 dBm and utilize the full 250-MHz bandwidth of a 24-GHz ISM band (24 GHz to 24.25 GHz). The duration of the unit chirp signal, the guard time between the unit chirp signals, and the number of unit chirp signals per symbol were set to 8.192 ms, 23 μs, and 32, respectively. 128 symbols from each measurement data were analyzed, the average thereof were calculated unless otherwise specified, and evaluation was performed by using a prototype tag.

Figure 12:
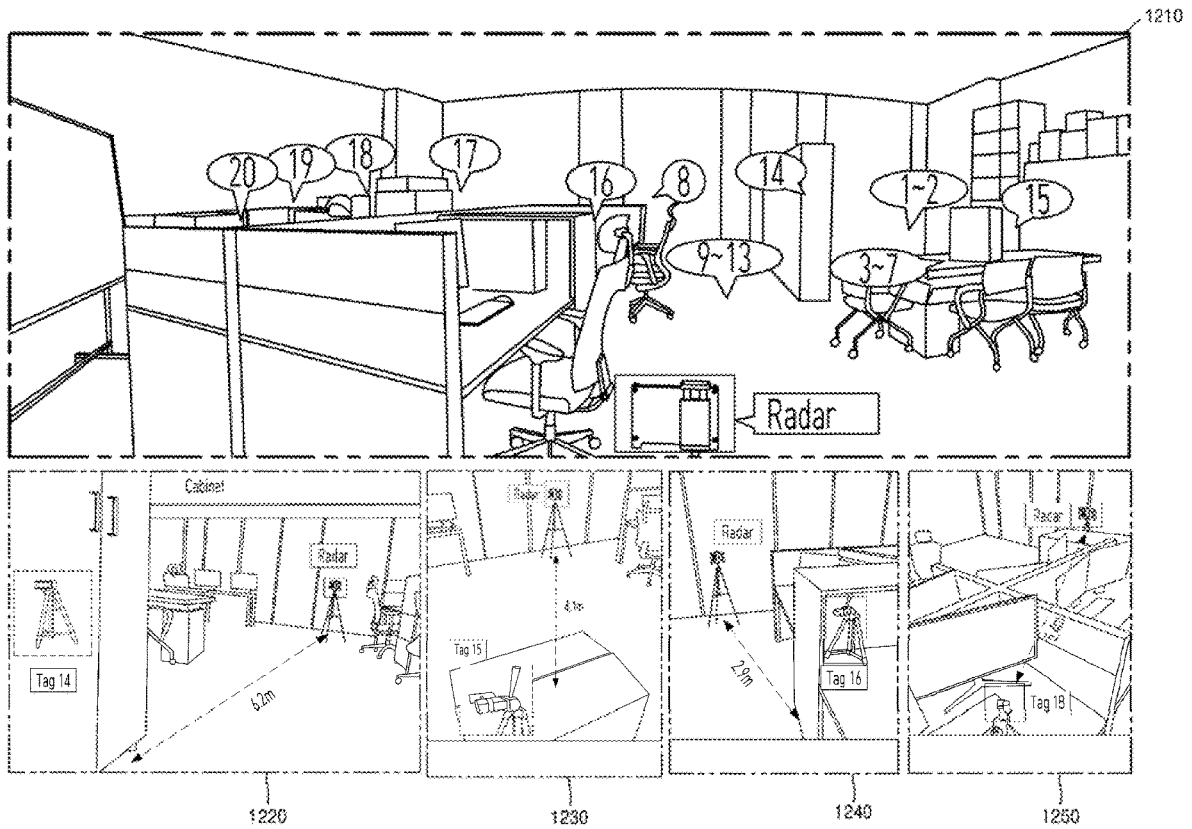
FIG. 12 is a diagram illustrating backscatter tags arranged in various locations.

FIG. 12 is a diagram illustrating backscatter tags arranged in various locations. 1210 of FIG. 12 is an example of backscatter tags arranged in various locations of an office space of 10 m×10 m, 1220 of FIG. 12 is an example of a backscatter tag arranged in a cabinet, 1230 of FIG. 12 is an example of a backscatter tag arranged on a cardboard box, 1240 of FIG. 12 is an example of a backscatter tag arranged to be obstructed by a bookshelf, and 1250 of FIG. 12 is an example of a backscatter tag arranged to be obstructed by metal partitions.

Figure 13:
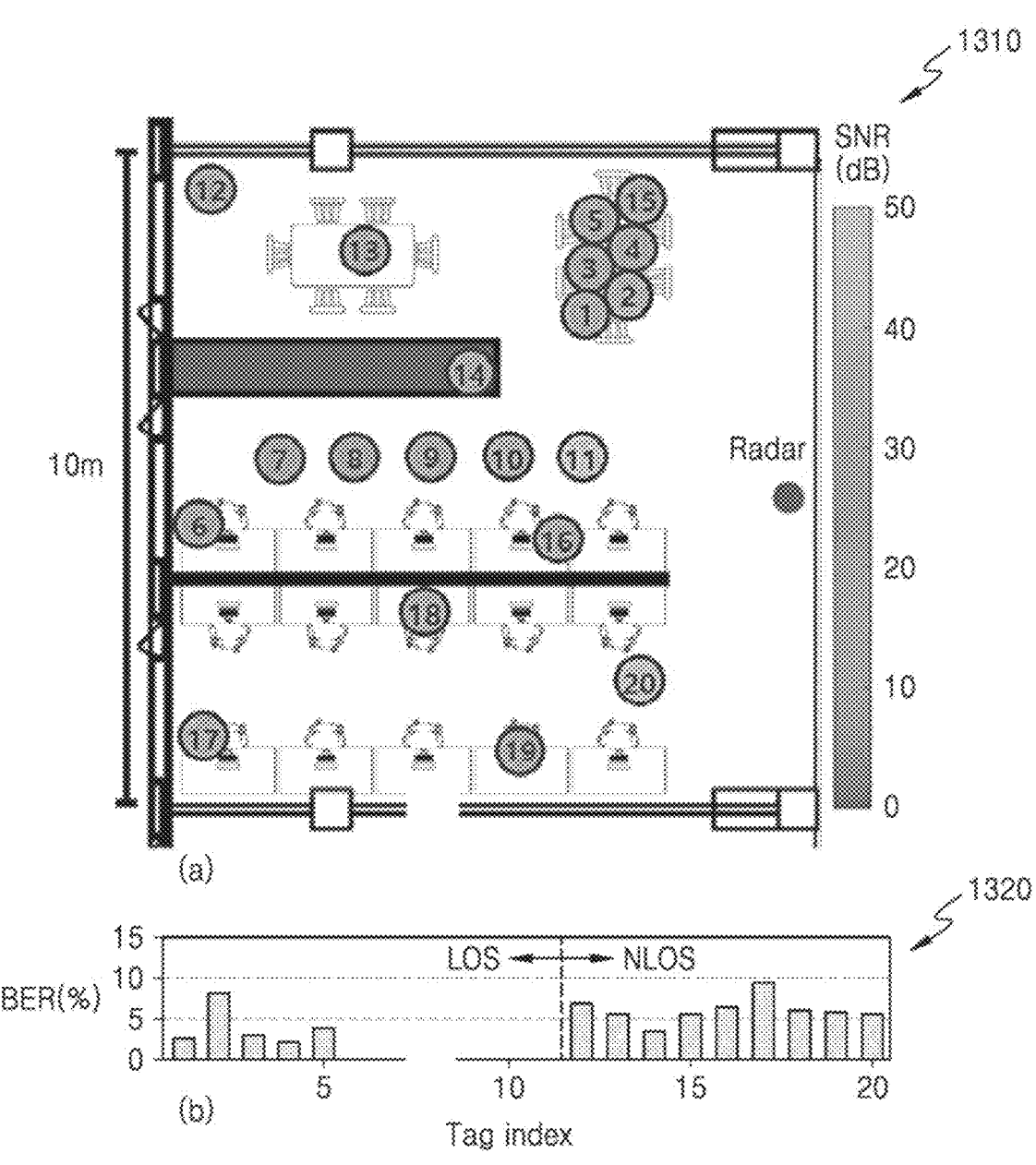
FIG. 13 is a diagram for describing communication performance based on backscatter tags arranged as in FIG. 12.

FIG. 13 is a diagram for describing communication performance based on the backscatter tags arranged as in FIG. 12.

1310 of FIG. 13 shows the SNR for each of the arranged backscatter tags in 1210 of FIG. 12. In addition, 1320 of FIG. 13 shows a bit error rate (BER) of a single omnidirectional radar.

Among the locations of all of the backscatter tags in 1210 of FIG. 12, up to four locations were repeatedly selected and evaluated by using the backscatter tags modulated at 150 kHz, 152 kHz, 154 kHz, and 156 kHz. The backscatter tags transmitted data at the same time, and the measured SNR is shown in the SNR heat map of 1310 of FIG. 13 and the BER graph of 1320 of FIG. 13. The direction or location of the radar was not changed during the experiment. As a result, the SNR of the entire office was 20 dB or greater, and the BER was less than 10%, demonstrating the performance of the present embodiment, and thus demonstrating the high practicality of the present embodiment. That is, according to the present embodiment, it is advantageous in that tags may be arbitrarily arranged, and it is possible to sufficiently support communication of all of the tags in an office by using a single antenna commercial radar.

Figure 14:
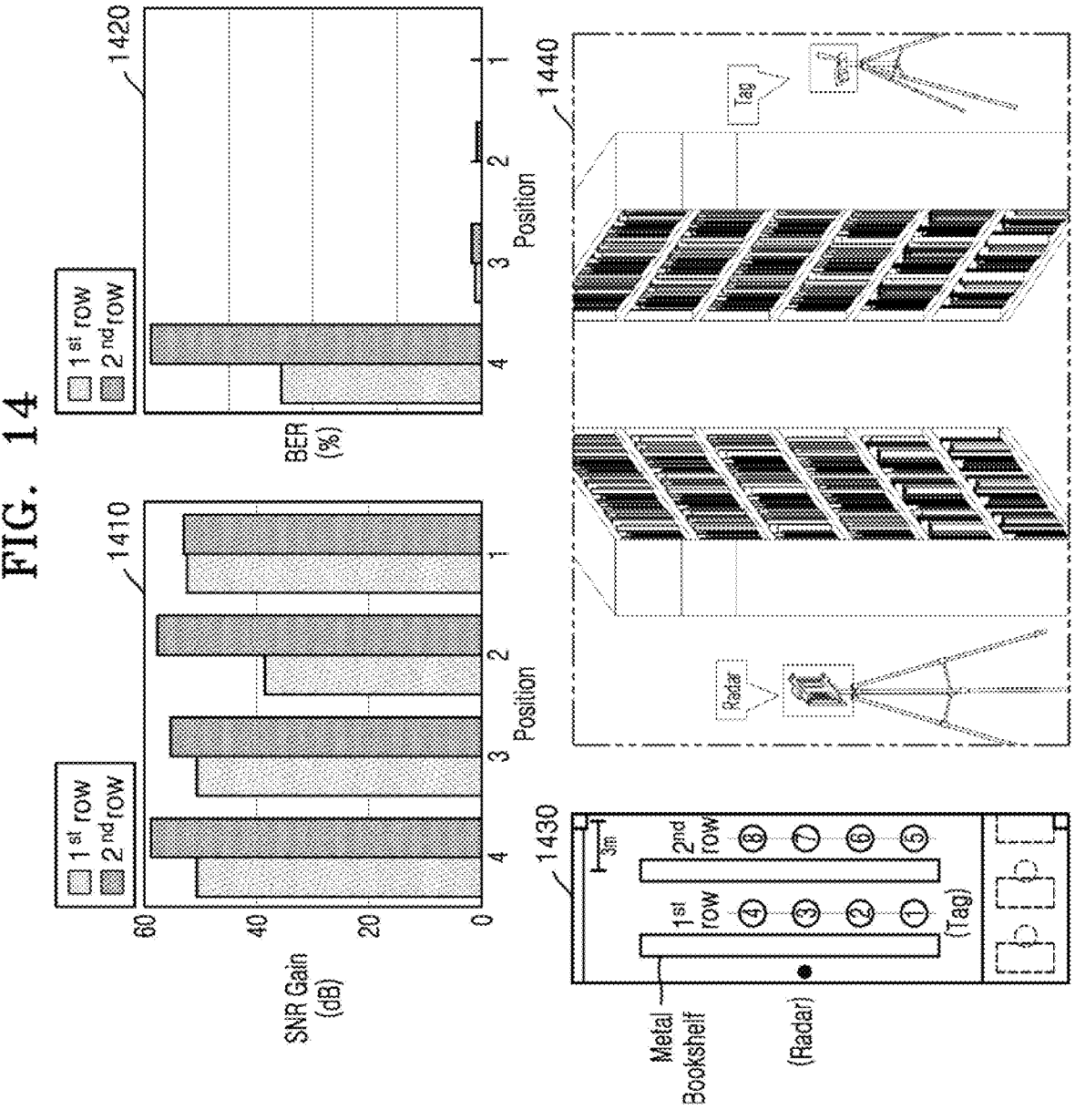
FIG. 14 is a diagram for describing communication performance in a state in which an interrogator and backscatter tags constituting a communication device are partially obstructed, according to an embodiment.

FIG. 14 is a diagram for describing communication performance in a state in which an interrogator and backscatter tags constituting a communication device according to the present embodiment are partially obstructed.

1410 of FIG. 14 shows SNRs measured in a state in which the communication device according to the present embodiment is arranged in a university library, and the interrogator and the backscatter tags are arranged to be obstructed by bookshelves. 1420 of FIG. 14 shows BERs measured in the state in which the communication device according to the present embodiment is arranged in the university library, and the interrogator and the backscatter tags are arranged to be obstructed by the bookshelves. 1430 of FIG. 14 is a plan view illustrating a state in which the interrogator and the backscatter tags are arranged, and 1440 of FIG. 14 is a drawing showing the state in which the interrogator and the backscatter tags are arranged.

As shown in 1430 and 1440, an experiment was conducted in the library in which wooden boxes and iron shelves filled with books were between the interrogator and the backscatter tags. The thickness of the metal shelf was 50 cm and the interval was 124 cm, and, as shown, the experiment was conducted at a total of 8 locations with tags with a modulation frequency of 10 kHz. The four locations in each row are spaced 135 cm from each other in a direction parallel to the shelves. The measured SNRs and BERs at the 8 tag locations are shown in 1310 and 1320.

As shown, even with two steel shelves between the tag and the radar, an average BER of 5% and an SNR gain of up to 58.4 dB were obtained. The SNR and BER deteriorated at location points 4 and 8 with thicker obstructions on the line-of-sight (LOS) links as the signal became more likely to hit the metal posts of the shelves. Communication was successfully performed even in a harsh non-LOS (NLOS) environment, thanks to the high SNR gain and removal of clutter noise of the present embodiment. These experimental results verify the robustness of the present embodiment in complicated and realistic NLOS communication scenarios.

Figure 15A:
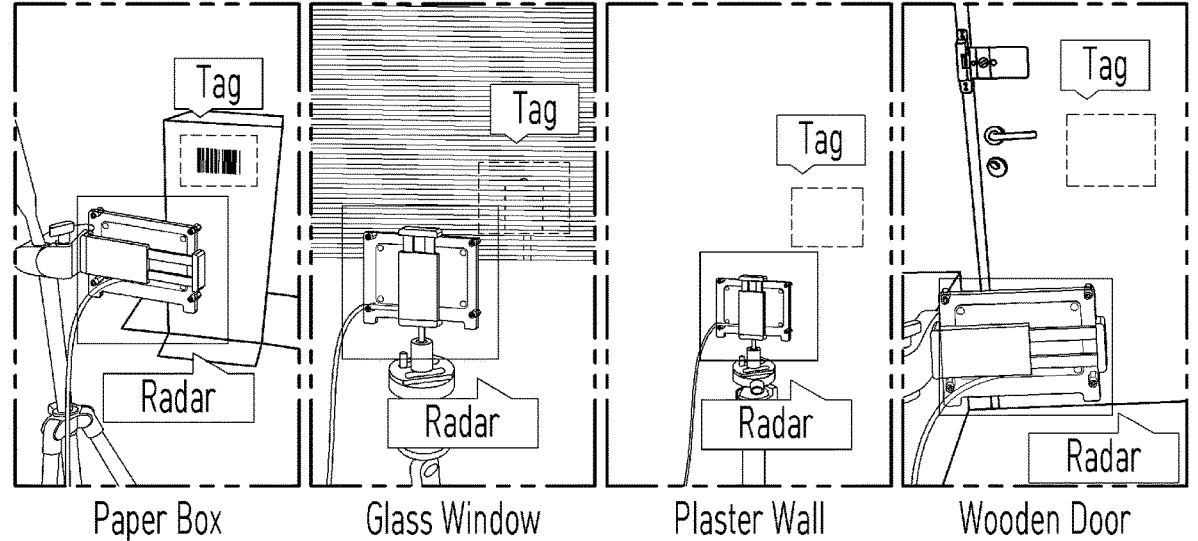
FIG. 15A is a diagram for describing a scenario in which various obstacles exist between an interrogator and a backscatter tag.

FIG. 15A is a diagram for describing a scenario in which various obstacles exist between an interrogator ('Radar' in the drawing) and a backscatter tag.

Figure 15B:
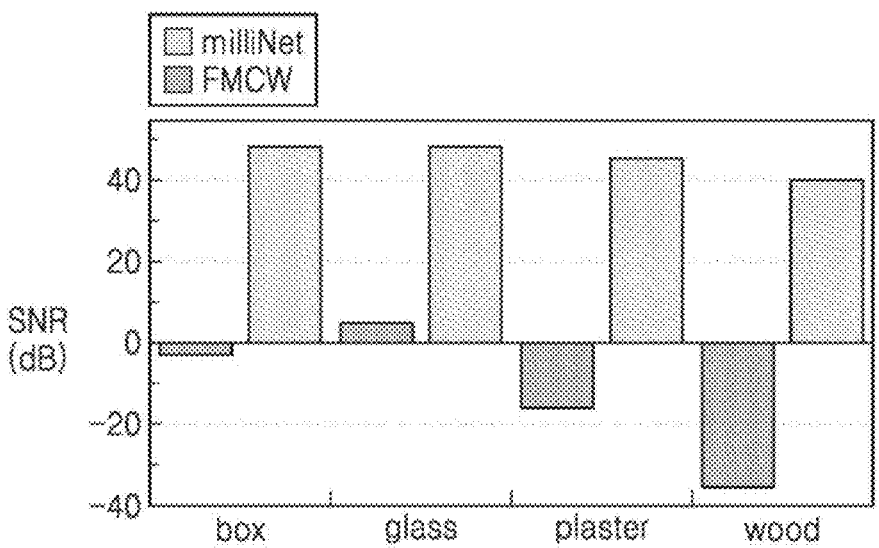
FIG. 15B is a diagram showing signal-to-noise ratios (SNRs) measured when obstacles exist.
Figure 15C:
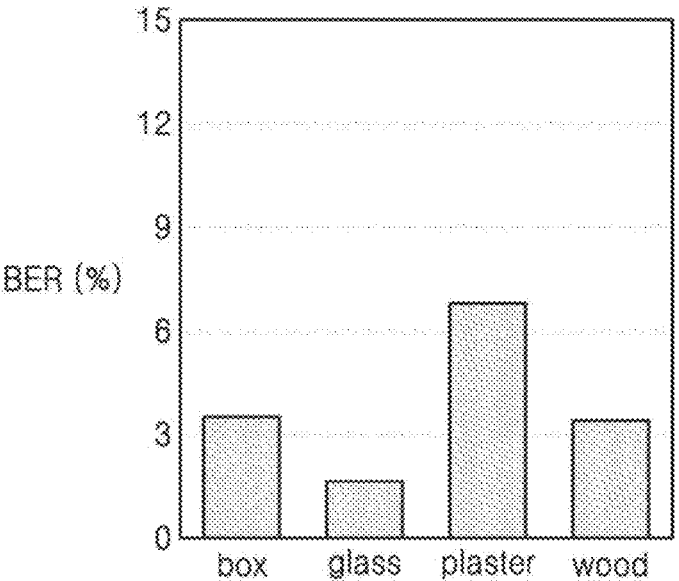
FIG. 15C is a diagram showing bit error rates (BERs) measured when obstacles exist.

FIG. 15B is a diagram showing SNRs measured when obstacles exist. FIG. 15C is a diagram showing BERs measured when obstacles exist.

As examples of obstacles, a 0.5 cm thick paper box, a 1 cm thick glass window, a 13 cm thick plaster wall, and a 4 cm thick wooden door were used. The backscatter tag was completely obstructed by the obstacle, and the only way to communicate with the interrogator was to penetrate through the obstacle. The backscatter tag performed modulation at 156 kHz for experiments. Each experiment was performed in a state in which the distance between the tag and the radar is 122 cm. The high-efficiency removal of clutter noise and SNR gain of the radar implemented as an interrogator exhibit excellent SNR and BER characteristics even in an obstruction scenario, with a high SNR gain of 40 dB or greater and a BER of up to 6.7%. As a result of verifying the communication stability even in various obstruction situations, the possibility of communication using the tag in different rooms was proven.

Figure 16A:
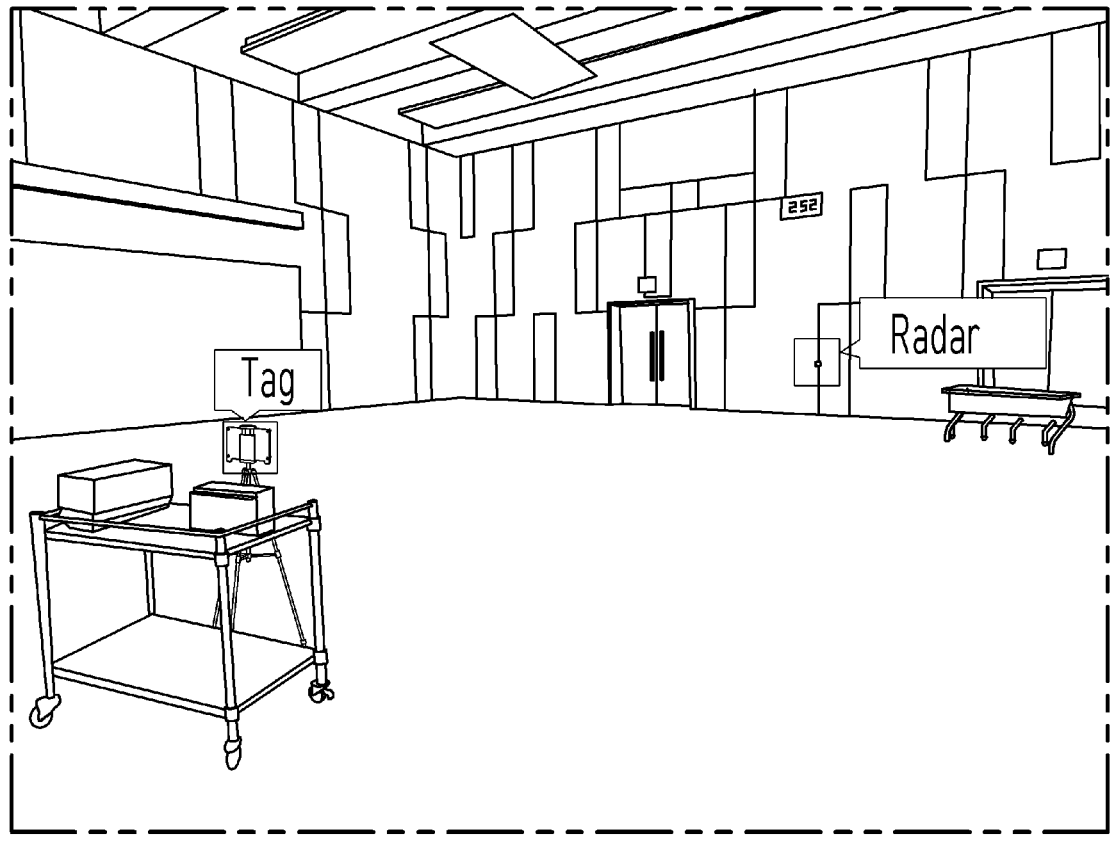
FIG. 16A is a drawing showing an auditorium having a size of 20 m×20 m for experimenting with large-scale communication.

FIG. 16A is a drawing showing an auditorium having a size of 20 m×20 m for experimenting with large-scale communication.

Figure 16B:
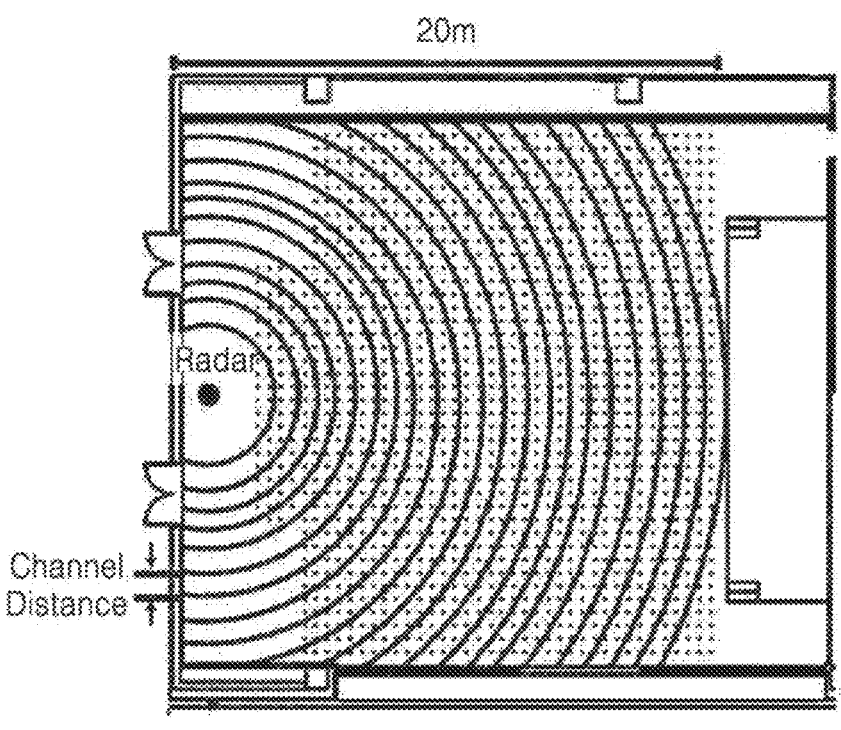
FIG. 16B is a diagram illustrating a scenario of arrangement of backscatter tags.

FIG. 16B is a diagram illustrating a scenario of arrangement of backscatter tags. In order to confirm the large-scale communication of the present embodiment, as illustrated in FIG. 16A, BERs were calculated from tags located in 1100 different location-frequency pairs in the auditorium having a size of 20 m×20 m. The range of the distances between the interrogator and the backscatter tags was 0.3 m to 14.1 m, and the modulation frequency range was 7315 Hz to 7414 Hz. The large-scale distribution BER was measured by summing all 1100 signal pairs.

Figure 17:
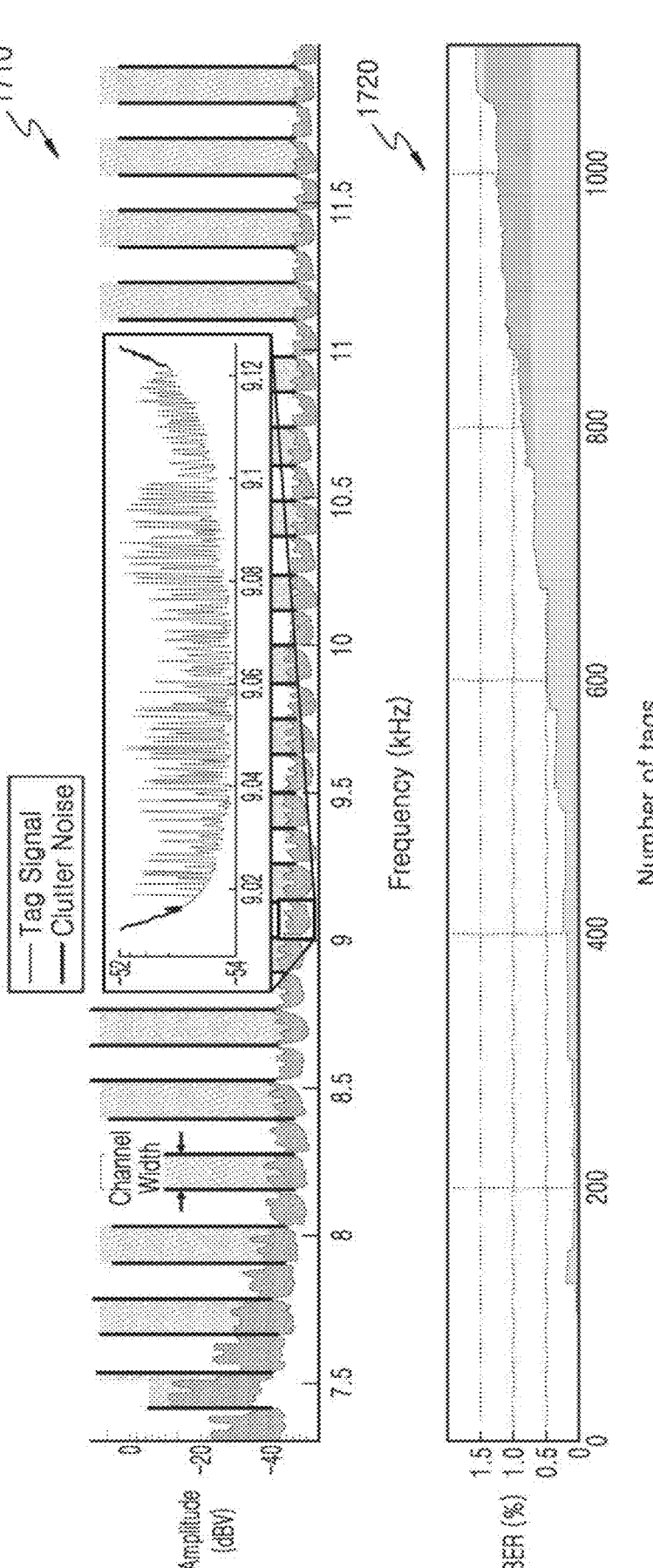
FIG. 17 is a diagram for describing signals of a plurality of backscatter tags and BER performance of the plurality of backscatter tags.

FIG. 17 is a diagram for describing signals of a plurality of backscatter tags and BER performance of the plurality of backscatter tags.

1710 of FIG. 17 is a diagram illustrating signals of 1100 backscatter tags along channels, and 1720 of FIG. 17 is a diagram illustrating BERs of all of the backscatter tags. Referring to 1710 and 1720 of FIG. 17, 1710 shows a partially enlarged demodulation result in summed signals, and it may be seen that the backscatter tags according to the present embodiment were located in different channels according to distance-based frequency-division multiple access. However, some tags share channels with other tags.

1720 shows the aggregated BER with respect to the number of aggregated tags after summing the signals. The tag signals are summed in the ascending order of distance. The demodulation result with BERs of less than 2% for all 1100 tag signals indicates the possibility of large-scale communication. It may be seen that a newly added tag has an increased communication distance, and thus, the aggregated BER increases as the number of added tags increases. It is also noted that, as the signals are summed, additive white Gaussian noise (AWGN) is also added, resulting in more severe conditions, however, even in such a case, the interrogator of the present embodiment was able to successfully demodulate all signals. This is achieved by removal of clutter noising and large-scale networking channel allocation design of the present embodiment, and it may be expected that the backscatter tags may operate on a large scale with an improved SNR in practice.

Figure 18A:
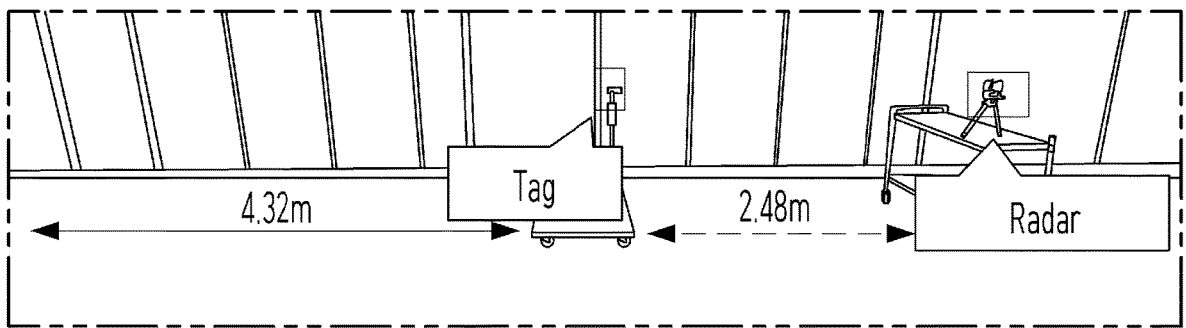
FIG. 18A is a diagram illustrating a path of a backscatter tag horizontally moving away from an interrogator.
Figure 18B:
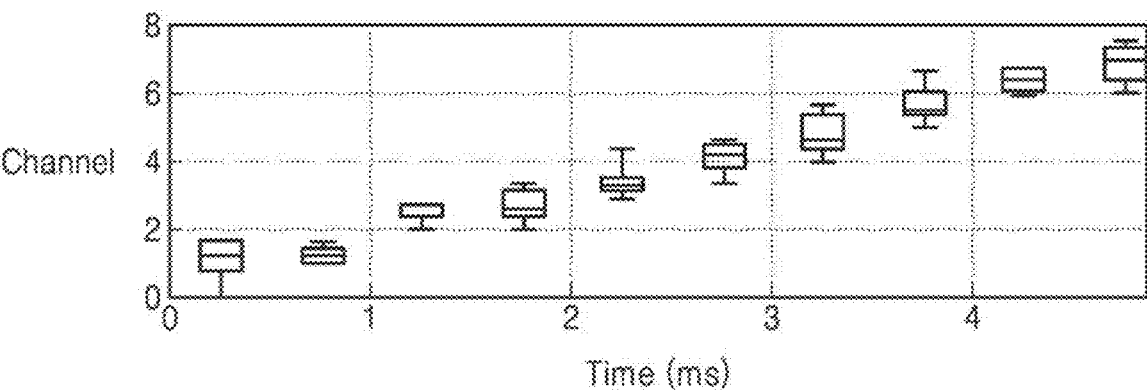
FIG. 18B is a diagram illustrating a channel when a backscatter tag horizontally moves away from an interrogator.
Figure 18C:
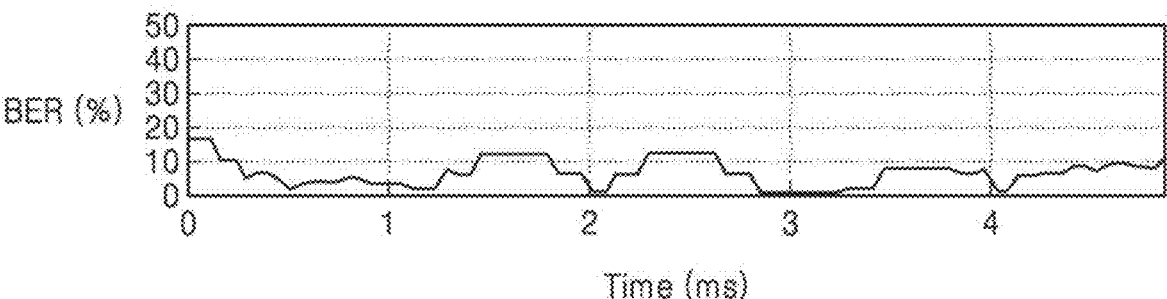
FIG. 18C is a diagram for describing a BER when a backscatter tag horizontally moves away from an interrogator.

FIG. 18A is a diagram illustrating a path of a backscatter tag horizontally moving away from an interrogator, FIG. 18B is a diagram illustrating a channel when the backscatter tag horizontally moves away from the interrogator, and FIG. 18C is a diagram for describing a BER when the backscatter tag horizontally moves away from the interrogator. In addition, FIG. 19A is a diagram illustrating a path of a backscatter tag vertically moving away from an interrogator, and FIG. 19B is a diagram for describing a BER when the backscatter tag vertically moves away from the interrogator.

Referring to FIGS. 18A to 19B, because the present embodiment does not require beamforming in the interrogator, a signal reflected by a movable backscatter tag may be successfully detected and demodulated. An experiment in a mobility environment was conducted by setting the number of chirps per symbol to 8 and analyzing a total of 1664 symbols for evaluation. FIG. 18A shows a simple indoor mobility experiment in which a tag is horizontally moved in a straight line of 4.15 m at a distance of at least 3 m from a radar. Measurement was performed for 13.7 seconds during which the tag was moving at 0.3 m/s. FIG. 18B shows channel allocation according to a time period during which a channel moves according to a radar-tag distance, and it may be confirmed, from results of these mobility experiments, that the present embodiment has excellent communication performance even in a mobility environment. FIG. 18C shows a BER over time, and the average BER during movement was 6.4%.

Figure 19A:
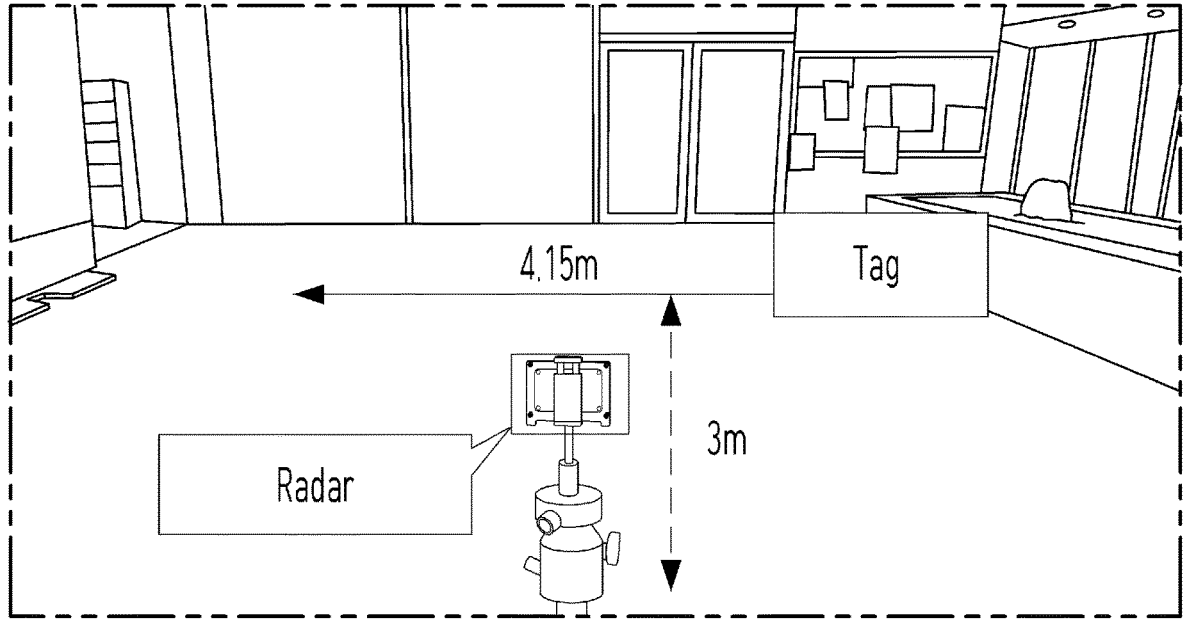
FIG. 19A is a diagram illustrating a path of a backscatter tag vertically moving away from an interrogator.
Figure 19B:
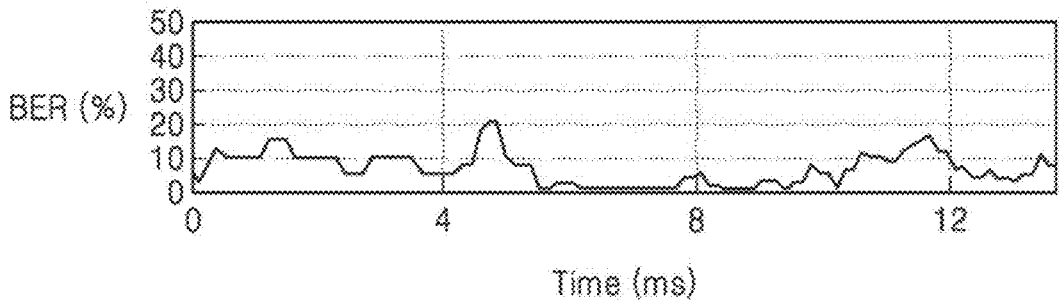
FIG. 19B is a diagram for describing a BER when a backscatter tag vertically moves away from an interrogator.

FIG. 19A shows another indoor mobility in which a tag vertically moves 4.32 m (from a 2.48 m point to a 6.8 m point) along a straight line for 48.5 seconds at 0.9 m/s. FIG. 19B shows a BER over time, and the average BER during movement was 6.2%. The tags in both experiments were modulated at 156 kHz. The plots of the results shown show successful tag signal demodulation even in a mobility environment.

Various embodiments may be implemented or supported by one or more computer programs, which may be produced from computer-readable program code and stored in a computer-readable medium. In the disclosure, the terms "application" and "program" refer to one or more computer programs, software components, instruction sets, procedures, functions, objects, classes, instances, relevant data, which are suitable for an implementation in computer-readable program code, or a part thereof. The term "computer-readable program code" may include various types of computer code including source code, object code, and executable code. The term "computer-readable medium" may include various types of media that is accessible by a computer, such as ROM, RAM, a hard disk drive (HDD), a compact disc (CD), a DVD, or various types of memory.

In addition, a machine-readable storage medium may be provided in the form of a non-transitory storage medium. Here, the term 'non-transitory storage medium' refers to a tangible device, and may exclude wired, wireless, optical, or other communication links that transmit temporary electrical or other signals. In addition, the term 'non-transitory storage medium' does not distinguish between a case in which data is stored in a storage medium semi-permanently and a case in which data is stored temporarily. For example, the non-transitory storage medium may include a buffer in which data is temporarily stored. A computer-readable medium may be any available medium that is accessible by a computer, and may include a volatile or non-volatile medium and a removable or non-removable medium. The computer-readable media includes media in which data may be permanently stored and media in which data may be stored and overwritten later, such as a rewritable optical disc or an erasable memory device.

According to an embodiment, the method according to various embodiments may be included in a computer program product and provided. The computer program products may be traded as commodities between sellers and buyers. The computer program product may be distributed in the form of a machine-readable storage medium (e.g., a CD- ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

While the embodiments have been particularly shown and described, it will be understood by one of ordinary skill in the art that various changes in form and details may be made therein without departing from the spirit and scope of the disclosure. For example, the described techniques may be performed in a different order from the described method, and/or components of the described system, structure, device, circuit, etc. may be combined or integrated in a different form from the described method, or may be replaced or substituted by other components or equivalents to achieve appropriate results. Hence, it should be understood that the embodiments described above are not limiting of the scope of the disclosure. For example, each element described in a single type may be executed in a distributed manner, and elements described distributed may also be executed in an integrated form.

The scope of the disclosure is not defined by the detailed description of the disclosure but by the following claims, and all modifications or alternatives derived from the scope and spirit of the claims and equivalents thereof fall within the scope of the disclosure.

According to an embodiment, there may be provided a backscatter communication method and device for large-scale communication in a wide bandwidth with low power.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A communication device comprising:
an interrogator configured to output interrogation signals including N consecutive unit chirp signals repeated for a predetermined period T and connected to each other to maintain continuous phase, and
a backscatter tag, included in Internet-of-Things (IoT) equipment, configured to provide tag signals which are generated by frequency-modulating the interrogation signals,
wherein the interrogator is further configured to receive the tag signals and demodulate the tag signals,
wherein the backscatter tag is configured to frequency-modulate the interrogation signals with data collected by the Internet-of-Things equipment, without information about a channel allocated to the backscatter tag, provide the frequency-modulated interrogation signals as the tag signals, and communicate with the interrogator over the channel determined by a distance between the interrogator and the backscatter tag,
wherein a signal generated by demodulating the tag signals is in N−1 discrete frequency components per channel, wherein the signal generated by demodulating the tag signals comprises a frequency component corresponding to a moving distance of the interrogation signals between the interrogator and the backscatter tag and a frequency component corresponding to a frequency modulating the interrogation signals, and wherein the backscatter tag operates without a battery by using power collected by energy harvesting.

2. The communication device of claim 1, wherein the interrogation signals belong to a millimeter-wave band.

3. The communication device of claim 1, wherein the interrogator comprises a demodulation unit configured to demodulate the tag signals, and the demodulation unit comprises:

a mixer configured to mix the interrogation signals with the tag signals to generate an intermediate signal; and a fast Fourier transform (FFT) unit configured to fast Fourier-transform the intermediate signal.

4. The communication device of claim 3, wherein the demodulation unit further comprises a low-pass filter configured to receive the intermediate signal and pass a signal component having a frequency corresponding to a difference between frequencies of the interrogation signals and the tag signals.

5. The communication device of claim 3, wherein the fast Fourier-transformed intermediate signal includes clutter noises, which are periodically positioned, and components of the tag signals, which are positioned without overlapping with the clutter noises in a frequency domain.

6. The communication device of claim 3, wherein, in the fast Fourier-transformed intermediate signal, clutter noises are in noise bins of a discrete frequency domain, components of the tag signals are in tag bins of the discrete frequency domain, and the tag bins and the noise bins do not overlap with each other in the discrete frequency domain.

7. The communication device of claim 6, wherein the tag signals are in one or more tag bins, and are spaced a frequency at which the backscatter tag modulates, from a plurality of noise bins respectively adjacent to the one or more tag bins.

8. The communication device of claim 7, wherein, when the backscatter tag is moving, the demodulation unit tracks signals of the moving backscatter tag by tracking signals spaced the frequency modulated by the backscatter tag, from the plurality of noise bins.

9. The communication device of claim 1, wherein the interrogator is configured to provide a single interrogation signal, wherein the communication device includes a plurality of backscatter tags, and wherein the interrogator is further configured to receive a plurality of tag signals generated by the plurality of backscatter tags modulating the single interrogation signal so as to perform simultaneous communication.

\* \* \* \* \*